Sept. 6, 1966     C. E. STANSELL     3,270,934
DISPENSING APPARATUS

Filed July 31, 1963     12 Sheets-Sheet 1

INVENTOR.
Charles E. Stansell
BY
ATTORNEY

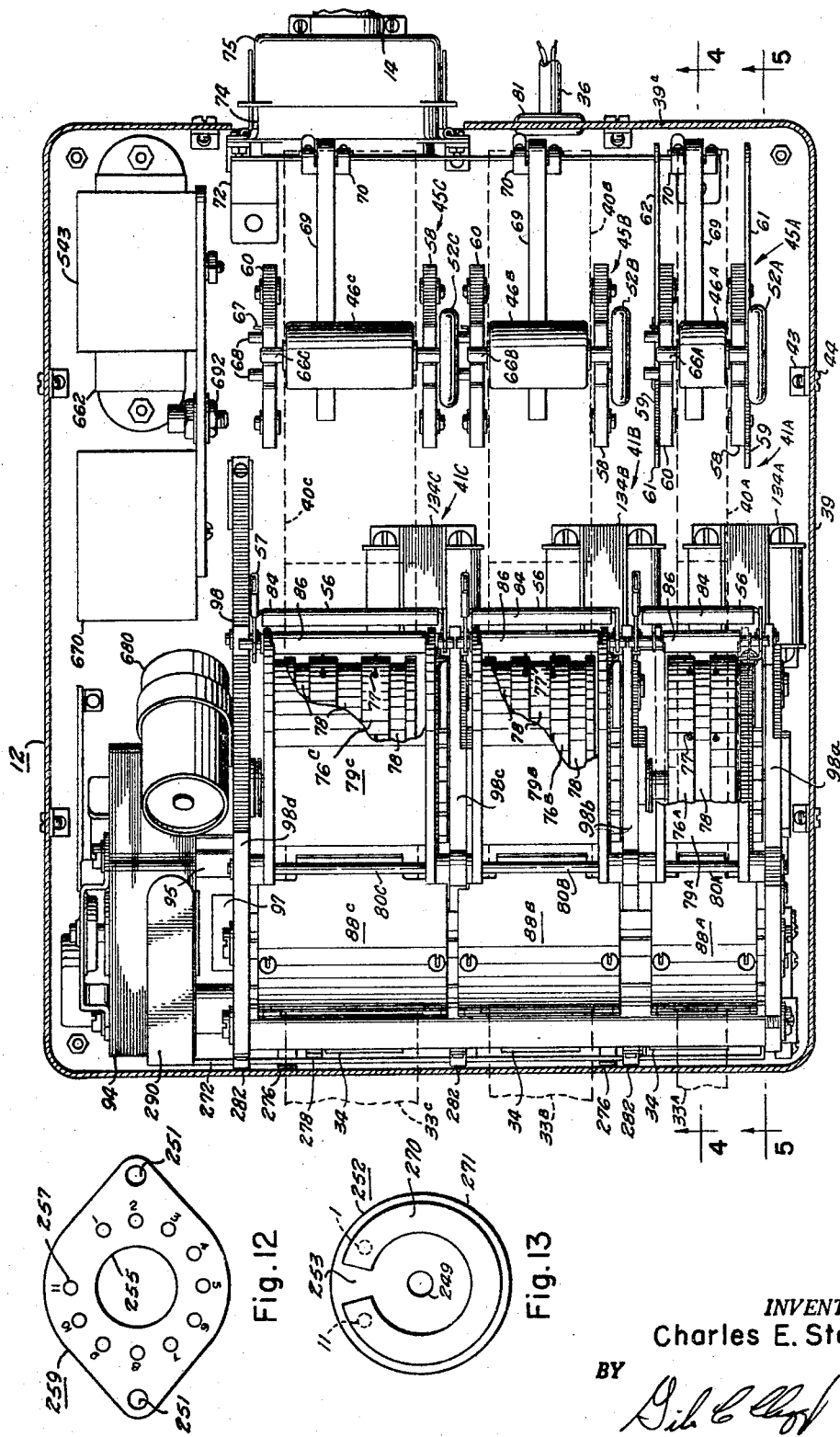

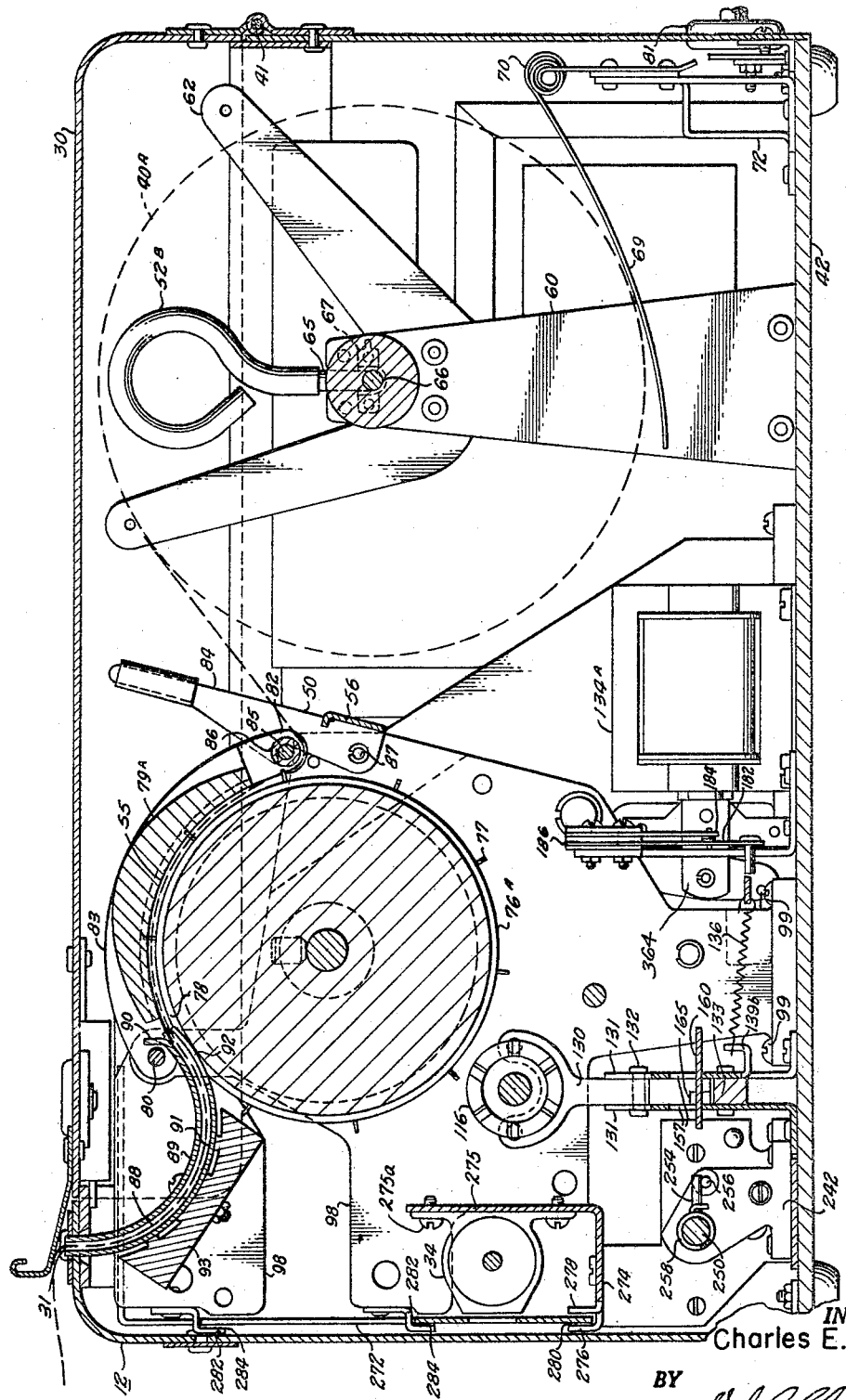

Sept. 6, 1966     C. E. STANSELL     3,270,934
DISPENSING APPARATUS
Filed July 31, 1963     12 Sheets-Sheet 4
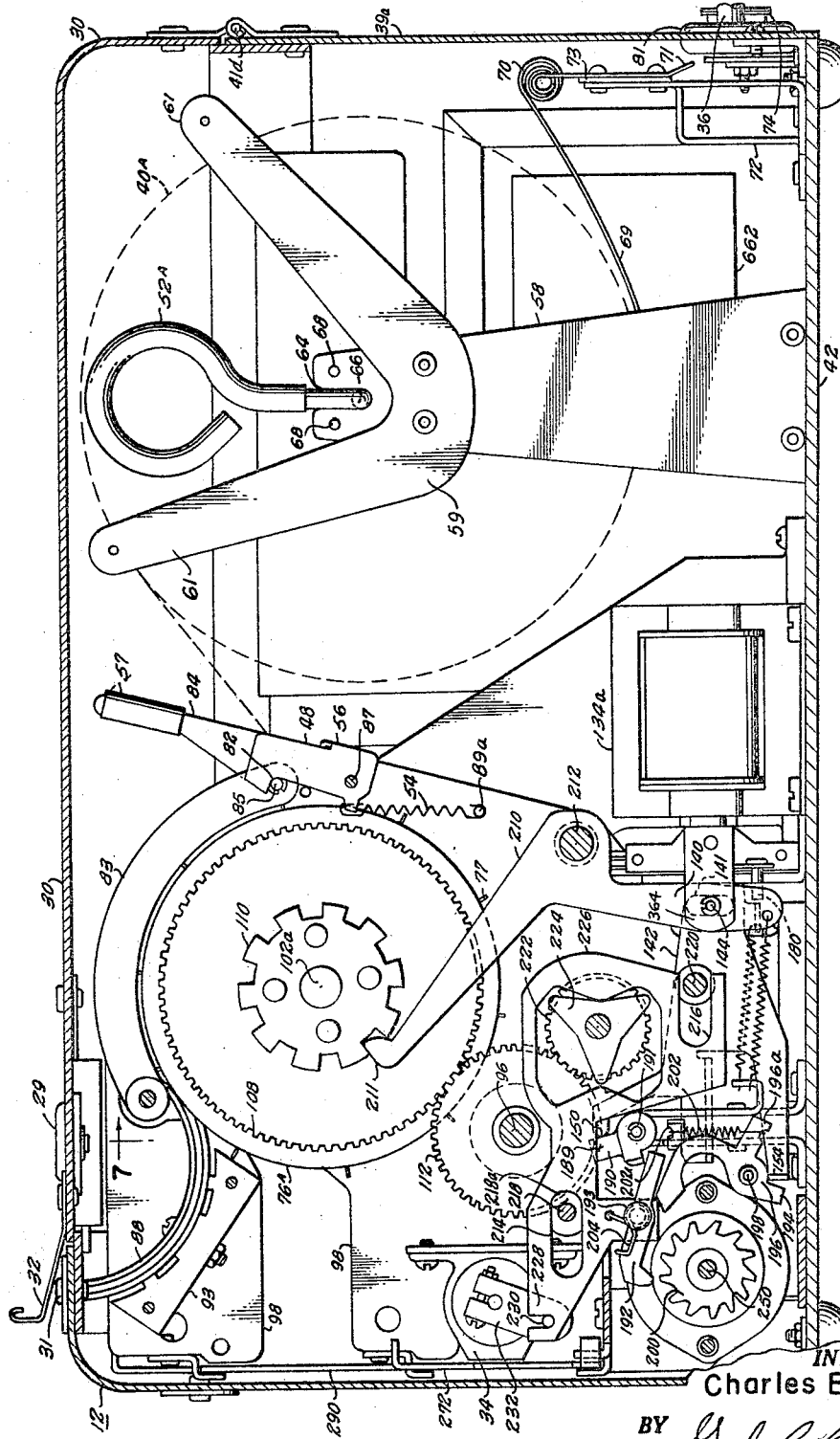
Fig. 5
INVENTOR.
Charles E. Stansell
BY 
ATTORNEY INVENTOR.
Charles E. Stansell Sept. 6, 1966   C. E. STANSELL   3,270,934
DISPENSING APPARATUS Filed July 31, 1963   12 Sheets-Sheet 6

INVENTOR
Charles E. Stansell

BY
ATTORNEYS

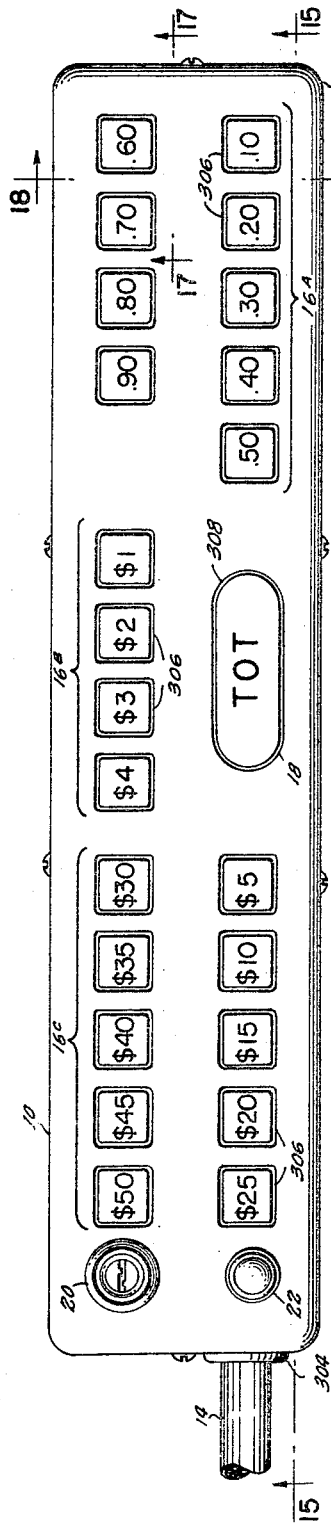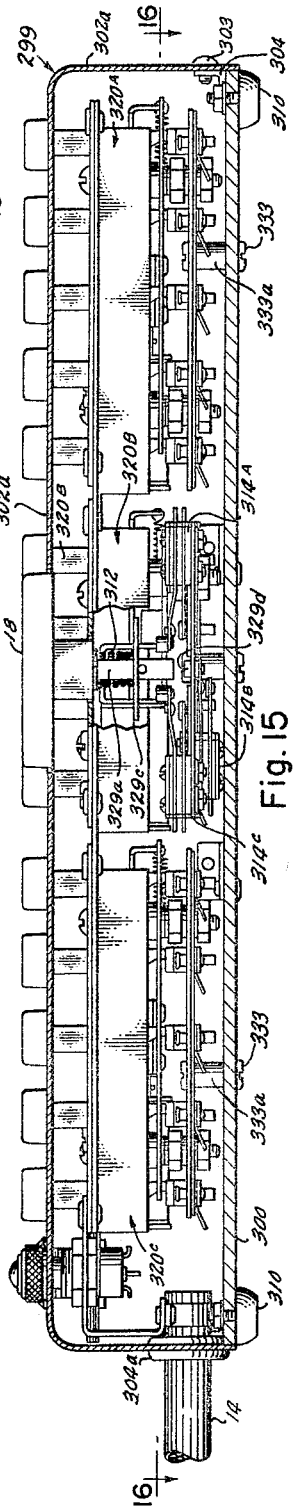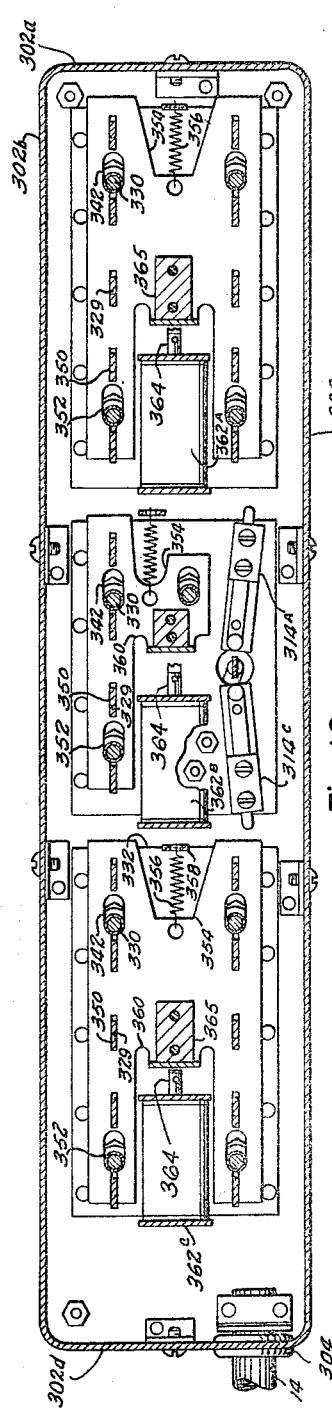

Sept. 6, 1966 C. E. STANSELL 3,270,934
DISPENSING APPARATUS

Filed July 31, 1963 12 Sheets-Sheet 8

INVENTOR.
Charles E. Stansell

BY

ATTORNEY

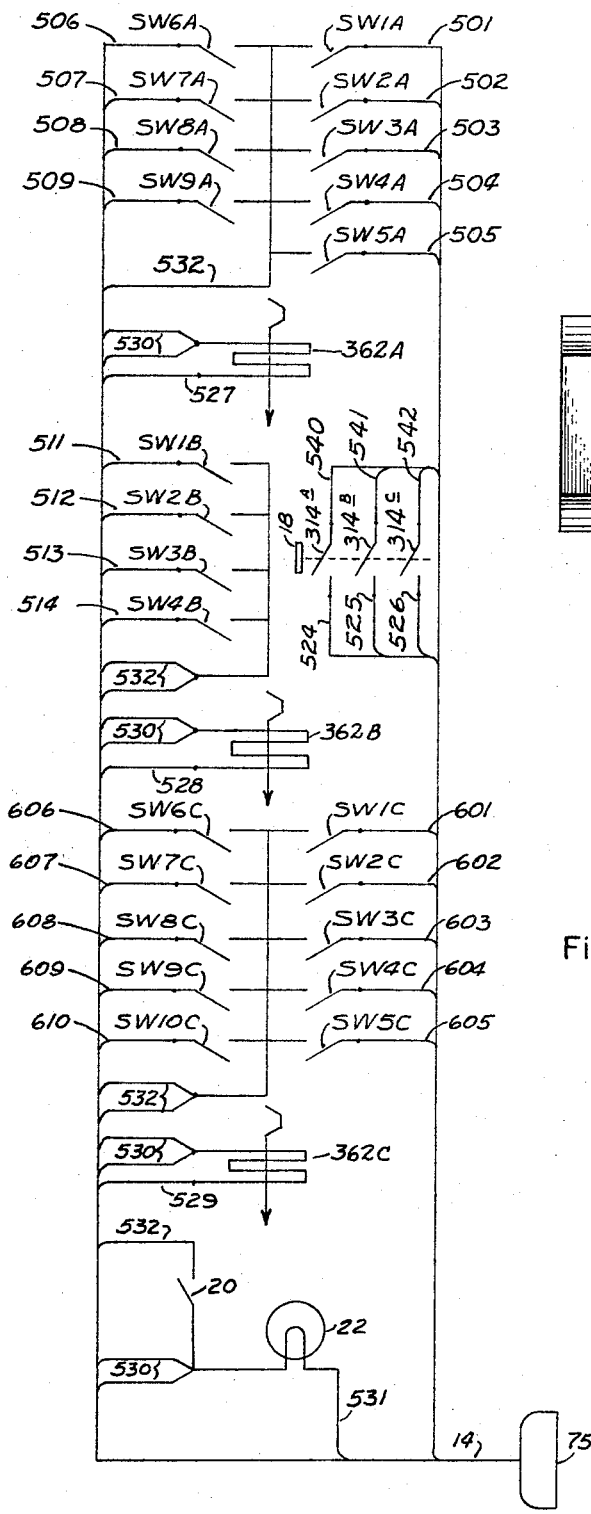
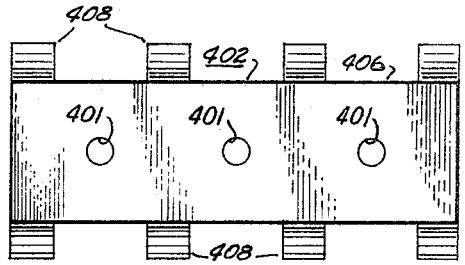
Fig. 20
Fig. 21
INVENTOR.
Charles E. Stansell
ATTORNEY

Sept. 6, 1966  C. E. STANSELL  3,270,934
DISPENSING APPARATUS
Filed July 31, 1963  12 Sheets-Sheet 10
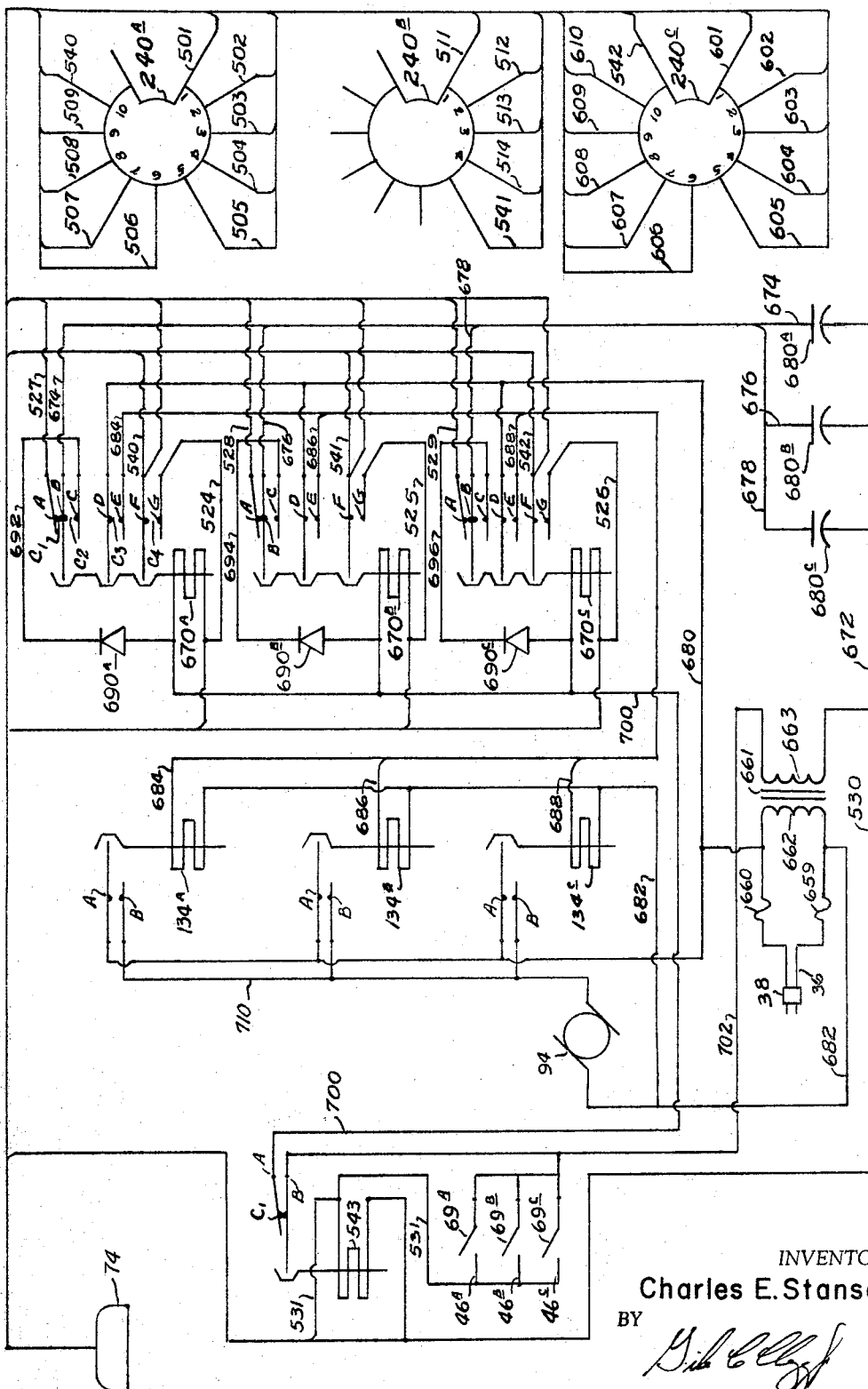
Fig. 22
INVENTOR.
Charles E. Stansell
BY
ATTORNEY

INVENTOR.
CHARLES E. STANSELL

3,270,934
DISPENSING APPARATUS
Charles E. Stansell, Dallas, Tex., assignor to Trolex Corporation, Dallas, Tex., a corporation of Texas
Filed July 31, 1963, Ser. No. 303,461
36 Claims. (Cl. 226—136)

This application is a continuation-in-part of my co-pending application, Serial No. 172,624, filed February 12, 1962, for A Tape Dispensing Apparatus, now Patent No. 3,173,732.

This invention relates to dispensing apparatus and more particularly to a device for dispensing perforated tapes or strips of trading stamps, coupons and the like and to a control device for controlling the operation of the dispensing device.

It is a common practice for many retail stores to dispense trading stamps as a bonus with each purchase. These trading stamps may be of various denominations and the face amount of the trading stamps given to a customer is normally related to the amount of his purchase. The trading stamps may have an actual cash redemption value or may be exchanged by the customer for appliances or other goods. The stamps are normally purchased by the retailer and the cost of the stamps and of the labor and time expended in dispensing these stamps is in many instances a significant portion of the operating expense of a store and constitute a substantial portion of the advertising budget of the retailer. In the course of many sales handled by a retail store, a relatively large portion of the sales clerk's time is devoted to counting and dispensing the trading stamps given as bonuses to customers. In addition to the great amount of time thus lost, it has been the experience of most stores that the manual dispensing of stamps does not provide for the desired degree of control in dispensing correct amounts of the stamps to each customer. If the customer receives a smaller amount of stamps than he is entitled to, the customer's good will may be lost, and of course if he receives a greater amount than he is entitled to the cost of the retailer is increased. In addition, the manual handling of stamps accompanying each purchase often results in accidental dropping or tearing of stamps and thus their loss.

Accordingly, it is desirable that a stamp dispensing apparatus be provided which permits dispensing of accurate numbers of such stamps as determined by the amount of the purchase and with a minimum of expenditure of time on the part of the clerk or cashier and with no manual handling of the stamps by the clerk or cashier.

Accordingly, an object of this invention is to provide a new and improved stamp dispensing apparatus having a dispensing device which dispenses the amounts of stamps any without manual handling to the stamps.

Another object is to provide a stamp dispensing apparatus whose operation is controlled by a control device of the key board type whereby the actuation of the keys of the control device causes the automatic dispensing of amounts of stamps predetermined by such actuated keys.

Still another object is to provide a new and improved dispensing device for dispensing stamps from a plurality of rolls of tapes or strips of the stamps having a plurality of individual dispensing mechanisms, a motor which drives a common drive shaft and having means for causing actuation of the individual dispensing mechanisms associated with each tape for selectively connecting such individual dispensing mechanisms to the common drive shaft to cause the dispensing mechanisms to dispense predetermined amounts of stamps from the rolls.

A further object is to provide a new and improved stamp dispensing device wherein each dispensing mechanism includes a drive roller and wherein clutch means are provided for operatively connecting the drive roller of each individual mechanism to the main drive shaft.

A still further object is to provide a dispensing device wherein each individual dispensing mechanism includes a positive locking means for locking the drive roller against rotation when it is inoperative and with a counter device for counting the number of stamps dispensed from the roll of stamps so that the manager or other responsible person can determine at any time the number of stamps that have been dispensed from each roll of stamps.

Another object is to provide a dispensing device wherein the clutch means, the locking means and the counter of each dispensing mechanism are operable by a single solenoid whose energization is controlled by the control device.

Still another object is to provide a dispensing mechanism having means for preventing operation thereof when a roll of stamps has been completely dispensed.

A further object is to provide a new and improved control device for controlling the operation of a dispensing device which has a plurality of sets of keys and mechanical means permitting only one key of each set to be actuated at any particular time.

A further object is to provide a new and improved control device of the type described having means for moving all keys to their inoperative positions upon the completion of a dispensing operation by the dispensing device.

A still further object is to provide a new and improved control switch having a set of keys movably mounted on a mount plate and engageable by a latch plate for holding an actuated key in its actuated or operative switch closing position and which releases any depressed key for movement to its upper inoperative position upon the actuation of another key of the set to its operative position.

Still another object of the invention is to provide a control device having means for moving the latch plate to release any key held thereby in its actuated or operative position upon the completion of the dispensing operation.

Additional objects and advantages of the invention will be readily apparent from the reading of the following description of a device constructed in accordance with the invention, and reference to the accompanying drawings thereof, wherein:

FIGURE 3 is a sectional view, with some parts broken away, of the dispensing device of the dispensing apparatus;

FIGURE 4 is a sectional view taken on line 4—4 of FIGURE 3;

FIGURE 5 is a sectional view taken on line 5—5 of FIGURE 3;

FIGURE 12 is a view of a contact assembly mount plate of the switch of the dispensing mechanism;

FIGURE 13 is a view of a contact plate of the switch;

FIGURE 14 is a plan view of the control device of the dispensing apparatus illustrated in FIGURE 1;

FIGURE 15 is a sectional view taken on line 15—15 of FIGURE 14;

FIGURE 16 is a sectional view taken on line 16—16 of FIGURE 15;

FIGURE 20 is a plan view of another electric contact of the control device illustrated in FIGURE 14;

FIGURE 21 is a schematic illustration of the electric circuit of the control device;

FIGURE 22 is a schematic illustration of the electric circuit of the dispensing device;

Figures 1, 2:
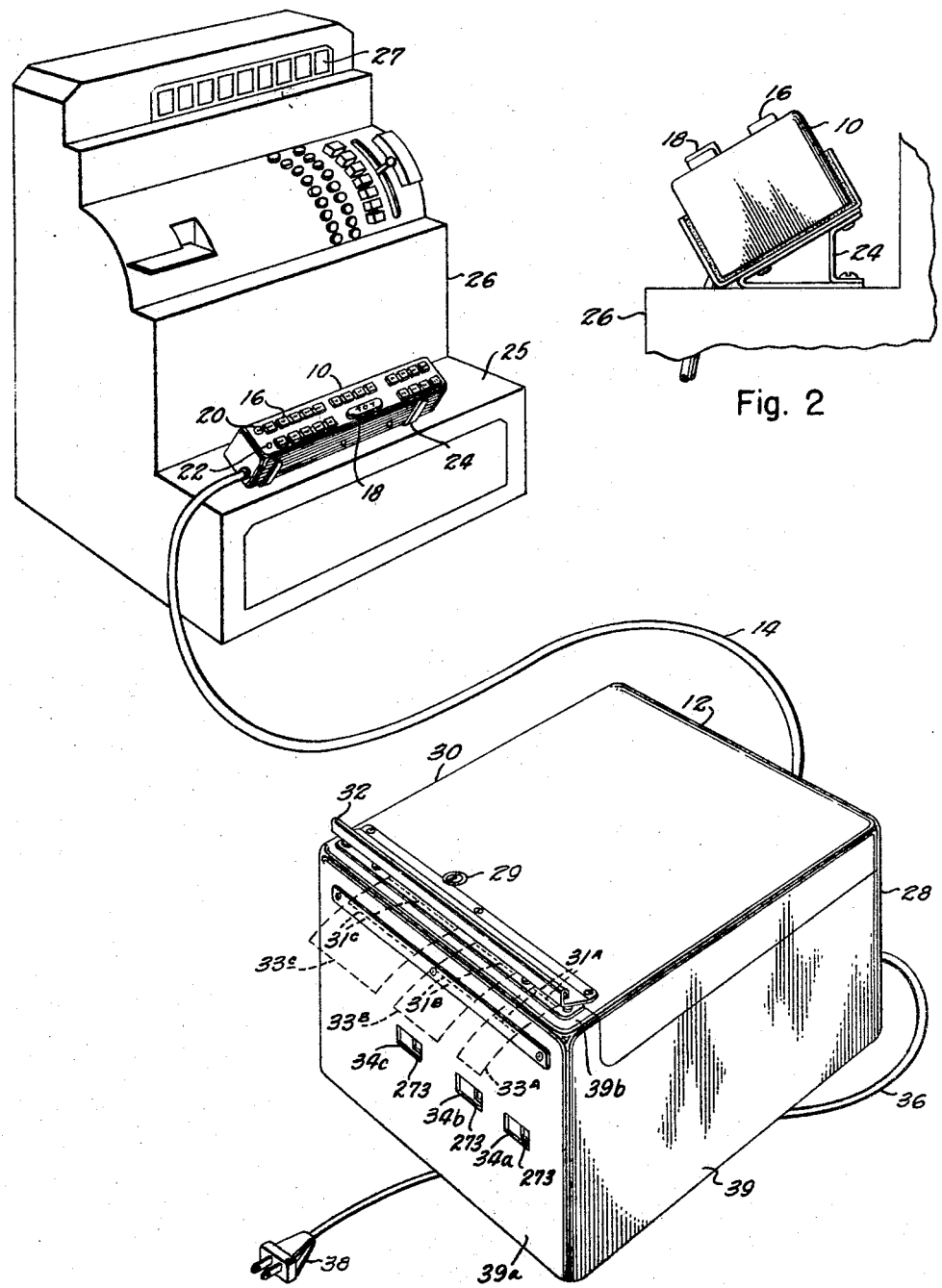
FIGURE 1 is a perspective view of the dispensing apparatus embodying the invention showing it in use with a conventional cash register.
FIGURE 2 is a side view showing the manner in which the control device of the dispensing apparatus is mounted on a cash register.

Referring now particularly to FIGURE 1 of the drawing, the dispensing apparatus embodying the invention includes a control device 10 and a dispensing device 12 which are electrically connected by a multi-conductor cable 14. The control device 10 includes a plurality of keys 16 grouped according to the denominations of the stamps to be issued and a total bar 18 for causing operation of the dispensing device when the proper keys 16 of each group of keys 16a, 16b and 16c have been actuated to predetermine the amount of stamps to be dispensed by the dispensing device. A key operated switch 20 controls the application of power to the control device 10 and prevents the unauthorized dispensing of stamps. A signal light 22 of the control device, when energized, indicates that the stamp dispensing device 12 needs loading with another load of stamps and that the machine is not in operative condition.

The control keyboard 10 may be secured by brackets 24 to a horizontal surface 25 of the conventional cash register 26 so that the clerk operating the cash register may easily see the amount of the purchase through the usual window 27 of the cash register and operate the proper keys 16 of the control device 10 which correspond to the amount of the purchase so that an appropriate amount of stamps will be issued by the dispensing device 12 when the total bar 18 of the control device is depressed. The stamp dispensing device 12 may be positioned at the end of the check out counter or some other position spaced from the control device 10 to permit a customer conveniently to receive the dispensed stamps.

The stamps are dispensed from a plurality of rolls of stamps 40A, 40B and 40C by means of individual dispensing mechanisms 41A, 41B and 41C respectively positioned in the case. The stamps in each strip of each roll of stamps normally vary accordingly to their denominations, the wider stamps being of greater value to facilitate handling and identification of the stamps. The rolls of stamps are in the form of a perforated tape, the perforations defining individual stamps. A key lock 29 locks a cover 30 on the open upper end of the case 28.

The cover 30 may of course be opened by unlocking the lock 29 to permit changing or insertion of the rolls of stamps into the dispension device.

The cover 30 of the case 28 is pivotally secured to the vertical rear wall 39c of the case 12 by the usual hinges 41d.

The case apertures 31A, 31B and 31C through which the stamps 33A, 33B and 33C issue from the case may be located either along the front vertical wall 39a of the case or along the upper top surface 39b thereof. Although the apertures 31A, 31B and 31C are shown in both the positions in FIGURE 1 in the drawing, normally the case is provided with only one set of these apertures. In the event that stamps are issued through the apertures in the top wall of the case a deflection plate 32 is secured to the top of the machine by any suitable means, such as screws, to direct the stamps toward the customer.

Suitable counters 34 are positioned beneath the dispensing apertures of the case and indicate the number of stamps of each roll that have been dispensed by the device. The dispensing mechanism of the dispensing device may be connected to any suitable source of electricity through a cable 36 equipped with a male plug 38 which is insertable into conventional female convenience outlets.

The case includes a bottom plate or wall 42 which is detachably secured to walls 39a, 39b, 39c and 39d by means of the angle brackets 43 and screws 44.

The rolls 40A, 40B, and 40C of the stamps 33A, 33B and 33C, respectively, shown in broken lines, are held in the case by the support assemblies 45A, 45B and 45C which are substantially identical in structure and, therefore, the corresponding elements of the support assemblies 45A, 45B and 45C have been provided with the same reference numerals to which the subscripts A, B and C, respectively, have been added. The rolls of stamps are disposed on the rollers 46A, 46B and 46C of the support assemblies. The rollers are preferably formed of an electrically conductive material and rotatably mounted on shafts or axles 66A, 66B and 66C, whose upwardly extending arms 47 have the insulated handles 52A, 52B and 52C which facilitate the removal of the rollers. The shaft 66 of the support assembly is received in the slots 64 and 65 of its associated vertical brackets 58 and 60 whose lower ends are rigidly secured to the bottom wall 42 of the case in any suitable manner. A conductor terminal 67 is secured to each of the brackets 60 and engages the axle 66 supported thereby to establish electrical contact therewith. A pair of spaced stop pins 68 extend laterally outwardly from each of the brackets 58 and 60 to engage the handles 52 of the shaft supported thereby and prevent rotation of the handle as the roll of tape and the roller on which the roll is disposed rotate about the shaft 66. The provision of the stop pins on each of the brackets 58 and 60 permits the handle 52 of each shaft to be positioned on either side of each pair of brackets.

Each support assembly includes a conductive lever or spring 68 which is biased upwardly toward its associated roller 46 by its integral helical spring portion 70 and has a terminal portion 71 to which an electrical lead or conductor may be connected. Each spring 69 is insulated from a mounting bracket 72 by means of which it is mounted on the bottom wall of the case by a suitable insulating strip or material 73. Each lever 69 bears against the outer lower surface of the roll of tape supported by its associated roller and prevents the roll from overrunning. When the roll of stamps has been dispensed, the spring engages the roller and establishes an electrical circuit therewith between the terminal 67 and the terminal portion 71 thereof and thus provides a signal that a new roll of tape must be placed on its associated roller.

A pair of plates 59 having angularly upwardly and outwardly extending ears 61 and 62 may be secured to the brackets 58 and 60 of any support assembly to engage opposite sides of the roll of tape carried by the roller of such assembly to prevent the roll of stamps from accidentally separating laterally. Such plates are particularly useful in holding a narrow roll of stamps.

A power cord 36 extends into the interior of the case through a suitable aperture in the rear wall 39c of the case and through a rubber grommet 81 which protects the cord. The multiterminal female connector 74 extends outwardly through a suitable aperture in the rear wall of the case and is rigidly secured to the bottom wall in any suitable manner as by bolts. The cable 14 which connects the control device 10 to the dispensing device has a male connector 75 which mates with the female connector to connect the cable 14 to the three dispensing mechanisms 41A, 41B and 41C of the dispensing device.

The dispensing devices 41A, 41B and 41C include drive rollers 76A, 76B and 76C each of which is rigidly secured in any suitable manner to its individual associated shaft 102 journaled in suitable bearings 104 and 106 carried by a pair of support plates 98 between which the drive roller is positioned. The lower ends of the support plates are rigidly secured to the bottom wall in any suitable manner, as by the screws 99.

Each of the drive rollers has a plurality of circumferentially spaced and laterally aligned splines or pins 77 protruding from the surface thereof. The pins extend through the perforations dividing the rolls of stamps into individual stamps. Annular grooves 78 which separate the rows of pins are formed in the surface of the drive rollers 76.

Cover plates 79A, 79B and 79C for the drive rollers 76A, 76B and 76C, respectively, are pivotally mounted by means of the pins 80A, 80B and 80C which extend between adjacent pairs of the support plates 98. The cover plates are formed with grooves 55 in their under surfaces which are alignable with the rows of pins 77 so that the pins 77 may protrude into the grooves 55 insuring that the pins extend through the perforations of the tape or strip of stamps. The cover plates have latches 84 for holding the cover plates in operative association with their respective drive roller. Each cover plate latch includes a pair of side members 48 and 50 connected by a laterally extending bar 56 and pivotally secured between and to an adjacent pair of the support plates 98 by means of a shaft 87 which extends through suitable aligned apertures in the side members of the latch. The side members are provided with notches or hooks 82 which are engageable with the laterally extending rod 85 secured to the side flanges 83 of the associated cover plate 79 and which extends laterally outwardly of the side flanges. A resilient plastic sleeve 86 may be disposed on the rod 85 between the side flanges to minimize the frictional engagement thereof with the strip or tape of stamps as it changes direction of movement to pass between the drive roller and its associated cover plate. The side member 50 is provided with a handle 57 by means of which the locking mechanism may be pivoted about its shaft 87. The latch is biased in a counter clockwise direction about its shaft 87, as seen in FIGURES 4 and 5, by a spring 54, one of whose ends is secured to a suitable extension of the side plate 48 and whose other end is secured to a pin 89a which extends laterally outwardly from an adjacent support plate 98.

It will be apparent that when it is desired to open one of the cover plates 79, its associated latch is pivoted in a clockwise direction about its shaft 87 to disengage the hooks 82 from the rod 85 of the cover plate. After the hooks of the latch are moved out of engagement with the rod, the cover plate may be pivoted in a counter clockwise manner about its shaft 80 to expose the upper surface of its associated drive roller. The reverse sequence of operations is performed when it is desired to secure a cover plate 79 in its lower or operative position holding a strip of stamps in engagement with the outer surface of its associated drive roller and with the pins thereon extending through the performations in the strip of stamps.

The stamps moved by the drive rollers 77A, 77B and 77C are moved to their associated apertures 31A, 31B and 31C through the chutes 88A, 88B and 88C. Each chute includes an uppper plate 89 whose inner or rear portion 90 extends upwardly to facilitate the insertion of stamps into the chute. The lower plate 91 of the chute, which extends parallel and below the top plate 89 thereof, has slots 92 at its inner or lower portion to provide fingers 92 which extend into the grooves 78 formed in the rollers to direct the staps off the pins 77 as the drive roller rotates in a counter clockwise direction and into the chute. The chutes 88 are held in position by a bracket 93 whose opposite ends are secured to the support plates 98a and 98b. The length of each chute is such that when the perforations in a strip or tape of stamps are engaged by the drive roller pins 77, a transverse roll of perforations of the strip is in alignment with an edge of the case defining one side of the aperture 31 so that when the tape is pulled against such edge, the stamps will tear along such transverse aligned perforations.

The shafts 102 of the drive rollers each have a large gear 108 rigidly secured thereto which meshes with a gear 112 rotatably mounted on a main shaft 96 journaled in suitable bearings 100 of the support plates 98. The shaft 96 is connected in suitable manner to an output shaft of a speed reducing mechanism 97 whose input shaft is connected to the drive shaft 95 of the electric motor 94. The motor 94 may be rigidly secured to the case by any suitable means, such as bolts or the like, between the side wall 39b of the case 12 and the support plate 98d. The shaft 96 of course extends through suitable aligned apertures of the support plates 98 in which the bearings 100 are positioned. A spring 114 is disposed about the main shaft 96 and between the lateral side surface 124 of each of the gears 112 and the face surface 122 of a clutch plate 116 to bias the clutch plate away from the gear and hold the teeth 126 of the clutch plate out of engagement with the laterally extending teeth 128 of the gear. The clutch plate is capable of limited longitudinal movement on the main shaft but is held against rotation relative thereto by the pins 118 rigid with the shaft 96 which extend outwardly into the opposed slots 120 of the hub of the clutch plate. When a clutch plate is moved toward its associated gear 112 against the resistance of the biasing spring 114, its teeth 126 engage the lateral teeth 128 of the gear and, if the main shaft is rotating, the gear 112 is caused to rotate with the main shaft and thus causes the shaft 102 of its associated drive roller 76 to rotate. Each gear 112 is held against movement away from its associated clutch plate by a suitable collar disposed on and secured to the main shaft.

Figure 7:
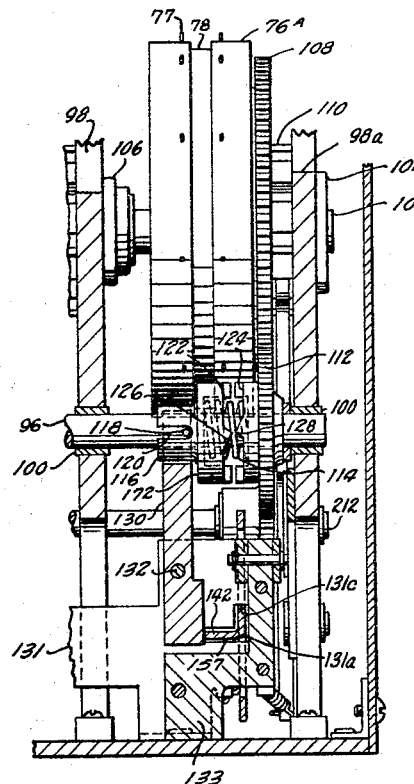
FIGURE 7 is a fragmentary sectional view taken on line 7—7 of FIGURE 5.
Figure 8:
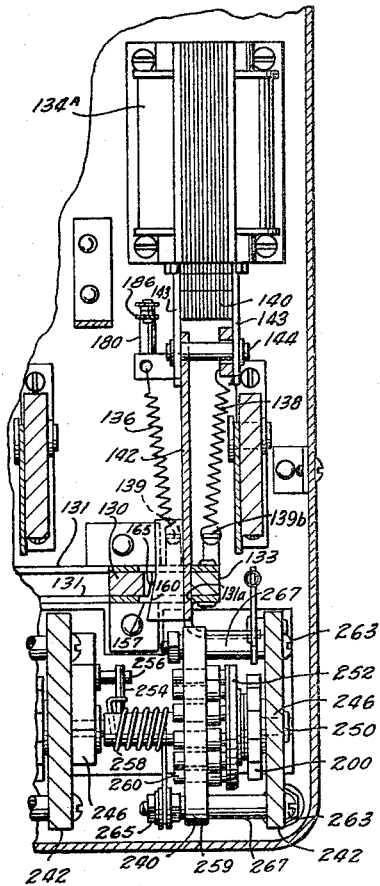
FIGURE 8 is a horizontal fragmentary sectional view.
Figure 6:
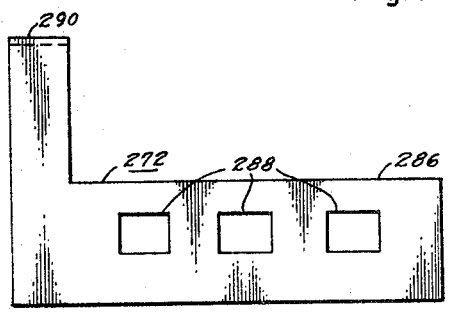
FIGURE 6 is a front view of a slide cover of the dispensing device.
Figure 11:
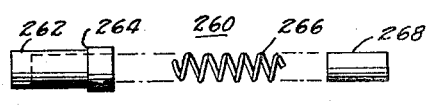
FIGURE 11 is an exploded view of a contact assembly of a switch of the dispensing mechanism.
Figures 9, 10:
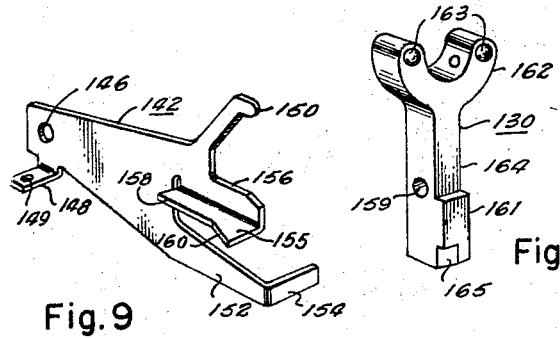
FIGURE 9 is a perspective view of a sliding cam of a dispensing mechanism.
FIGURE 10 is a perspective view of a clutch lever of the dispensing mechanism.

The clutch plate of each dispensing mechanism 41 is movable toward its associated gear 112 on the shaft 96 by a clutch lever 130 which has an upwardly opening yoke portion 162 and a downwardly depending straight portion 164. The clutch lever is mounted for pivotal movement intermediate its ends on a pin 132 which extends through an aperture or bore 159 of the clutch lever and which extends between and is rigidly secured to a pair of parallel vertical mounting brackets 131 held spaced from one another by a spacer 133 secured thereto in any suitable manner, as by screws or bolts. The lower straight portion 164 of the clutch lever extends between the brackets 131 and is movable therebetween since the spacer 133 is slightly greater in width than the width of the straight portion of the clutch lever. The yoke portion has a pair of ball bearings 163 which engage the planar annular surface 172 of the clutch plate and thus minimize the friction between the clutch lever and the clutch plate when the clutch lever is pivoted in a clockwise manner, FIGURE 7, to move the clutch plate toward the gear 112.

The clutch lever is pivoted by a clutch slide cam 142 which has a cam surface 160 engageable with a cam surface 165 provided on the enlarged lower portion 161 of the clutch lever. The cam surfaces 160 and 165 extend at an angle to the axis of the shaft 132 of the clutch lever so longitudinal movement of the cam plate 142 in one direction causes the clutch lever to pivot in a clockwise manner, FIGURE 7, about its shaft 132 and permits the clutch lever to be pivoted in the opposite counter clockwise direction by the force exerted thereon through the clutch plate by the clutch spring 114. The clutch cam is connected to the armature 140 of a solenoid 134 by a pin 144 which extends through the aperture 146 of the clutch cam and suitable aligned apertures in the forwardly extending arms 143 of the armature. The clutch cam and the armature are biased forwardly by a spring 136, one of whose hooked ends extends through the aperture 149 provided in the lateral arm or tab 148 of the clutch cam and whose other hooked end extends through a suitable aperture in the upwardly extending lug 139 of one of the mounting brackets 131. The armature, and therefore the clutch cam, are also biased forwardly by a spring 138, one of whose hooked ends extends through a suitable aperture in a lug 139b of an adjacent mounting bracket 131 and whose other end extends through a suitable aperture in the lower end of a holding lever 210 whose lower portion extends between the arms 143 of the armature and which is provided with an elongate slot 141 through which the pin 144 extends.

The holding lever 210 of the dispensing mechanism 41A is pivotally mounted intermediate its ends, as by a pin 212 secured to the support plate 98b and has a nose portion 211 which is engaged with the teeth of the lock gear 110 rigidly secured to the drive roller shaft 102A to hold the drive roller against rotation when the holding lever is held in its operative position, FIGURE 5, by the force of the spring 136 and 138 when the solenoid 134A is not energized.

The solenoids 134A, 134B and 134C of the dispensing mechanisms 41A, 41B and 41C, respectively, are rigidly secured to the bottom wall 42 in any suitable manner, as by bolts or screws.

The clutch cam 142 has an upper forwardly extending portion 152 terminating in a tab or portion 154 which extends at right angle to the portion 152, a central vertical planar portion 156 extending forwardly between the upper knob 150 and the lower portion 152. The central portion has a horizontal extension 155 which provides a surface 158 which extends parallel to the central portion 156 and the cam surface 160 which extends at an angle relative to the central portion 156 of the slide cam. The central portion 156 extends slidably through the aligned L-shaped slots 157 in the mounting brackets 131 so that the outer surface of the central portion bears against the surfaces 131a of the brackets defining the vertical sides of the slots 157 which thus hold the clutch cam against movement away from the clutch lever. The bottom surface of the extension 155 rests on the surfaces 131e of the mounting brackets defining the lower end of the slots 157 to hold it against downward movement. Upward movement of the clutch cam is prevented by the engagement of the upper edge of the surface of the central portion 156 with the surfaces 131c of the mounting brackets 131 defining the upper end of the slots 157.

The lateral tab 148 of the clutch slide cam 142 engages the pin 180 secured to the movable contact 182 of the switch 186 and moves it into engagement with the stationary contact 184 of the switch to close the switch when the armature of its associated solenoid is engaged, and the clutch slide cam is in its rear position. The switch 186 of each dispensing mechanism prevents the energization of the motor 94 when it is in open position so that the motor is energized only whenever at least one of the switches 186 of the dispensing mechanisms 41a, 41b and 41c is energized and its armature is in its retracted position.

The knob 150 of the clutch slide cam 142 engages the upwardly extending arm 189 of a pawl latch 190 pivotally mounted on a pin 191 secured to the spacer 133. The pawl latch is biased in clockwise direction, FIGURE 5, by a suitable spring (not shown) disposed about the pin 191. The pawl latch engages the rear end of a pawl 192 pivotally secured to a control plate 226, as by the pin 193, to hold the pawl in its inoperative position, FIGURE 5, and out of engagement with the teeth of the gear 200 of the control switch 240 when the solenoid 134 is not energized and the clutch slide cam is in its forward position. The pawl is biased toward engagement with the ratchet wheel 200 by a spring 204 one of whose ends is secured in any suitable manner to the control plate 226 and whose other end hooks over and engages the upper surface of the pawl. The forward lateral tab 154 of the clutch slide cam is engageable with the lower extension 194 of a dog 196 to hold it in its inoperative position, FIGURE 5, and out of engagement with the teeth of the ratchet wheel 200, when the armature 140 of the dispensing mechanism is in the forward or extended position. The dog 196 is pivotally mounted on a pin 198 secured to a mounting bracket 242. The switch shaft 250 is journaled in the mounting brackets 242 and 246 by means of suitable bearings.

The control switch 240 of each dispensing mechanism includes a ratchet wheel 200 rigidly secured to the switch shaft 250. A contact disk 252 of non-conductive substance has an arcuate contact strip 270 of conductive substance embedded in one side thereof so that the outer surface of the contact strip is flush with the outer surface of the contact plate and the surface 253 of the contact disk between the ends of the contact strip is also flush with the outer surface of the contact strip. The contact disk 252 has an aperture 249 through which the switch shaft extends and is rigidly secured to the shaft in any suitable manner.

The switch shaft also extends through a suitable central aperture 255 in a contact plate 259 which is rigidly secured to the mounting bracket 242 by means of bolts 263 which extend through suitable apertures 251 in the contact plate 259 and the nuts 265 threaded thereon. Suitable spacer sleeves 267 disposed on the bolts hold the contact plate parallel to and spaced from the mounting bracket 242.

The switch shaft is biased in a counter clockwise direction, FIGURE 5, by a spring 258 disposed about the switch shaft and between the mounting bracket 246 and the contact plate 259. One end of the biasing spring bears against a radially outwardly extending pin 254 rigidly secured to the switch shaft and its other end is secured to one of the bolts 263 by a nut 265. Clockwise movement of the shaft is limited by the engagement of its pin 254 with a pin 256 rigidly secured to the mounting bracket 246.

The shaft 250 of the control switch of each dispensing mechanism is rotated in a counter clockwise direction when the motor 94 is in operation and its solenoid 134 is energized by a pawl 192 which engages a tooth of the ratchet wheel 200 each time a control plate 226 is moved forwardly. The forward end of the dog 196 engages the teeth of the ratchet wheel to prevent the rotation of the switch shaft in a clockwise direction when the solenoid 134 is energized and the clutch slide cam 142 is in its rear or retracted position since the dog is biased in a counter clockwise direction about the pin 198 on which it is pivotally mounted by a spring 202, one of whose hooked ends extends about the rearwardly projecting arm 196a of the dog and whose other hooked end engages the laterally extending arm 202a of the forward mounting bracket 131.

The control switch 240 includes a plurality of contacts 260 mounted by means of the apertures 257 of the control plate except for the contacts in the apertures 11 and 1 which are arranged in a circle and spaced thirty degrees apart. The contacts in the apertures 1 and 11 are disposed on opposite sides of the segment surface 253 between the ends of the contact strip 270 and are spaced apart by sixty degrees. Each of the contacts 260 includes a tube 262 of brass or other conductive material. One end of the tube is closed and the tube has an annular external shoulder 264 adjacent its open end. A carbon rod 268 whose outer end surface is engageable with the contract strip 270 of the contact disk 252 telescopes into the bore of the tube and is biased outwardly toward the contact disk by a conductive spring 266 disposed in the bore of the tube 262 whose opposite ends bear against the closed end portion of the tube and the inner end surface of the carbon rod 268. The annular shoulder 264 bears against the insulating contact plate 259 to limit the movement of the tube away from the contact disk. The apertures 257 may be of such diameter relative to the external diameters of the tubes rearwardly of the shoulders 264 that the tubes are also held against displacement by the frictional engagement of the tubes with the contact plate.

When the dog 196 and the pawl 192 are in their inoperative positions, FIGURE 5, the switch shaft 250 is held in its normal non-actuated position by the force of the spring 258 wherein its radial pin 254 engages the pin 256 and the contact 260 in the aperture 1 of the contact plate bears against the contact strip 270 at a point spaced fifteen degrees from one edge of the surface 253 while the contact 11 engages the contact strip 270 on the other side of the surface 253. If the contact disk 252 is now rotated thirty degrees, which occurs each time the ratchet wheel 200 is rotated by the forward motion of the control plate 226, the non-conductive surface 253 will be moved into alignment with the contact in the aperture 1. If the ratchet wheel is again rotated through another thirty degrees, the second contact will contact the surface 253 and additional successive rotations of the ratchet wheel will successively cause the other contacts to bear against the surface 253 until the contact in the aperture 10 bears against the surface 253. The eleventh contact in the aperture 11 is a common contact and is always in engagement with the contact strip. As long as the selected contact and the common contact 11 both engage the terminal strip 270, the control switch 240 is closed. When the selected contact engages the surface 253 between the adjacent ends of the arcuate contact strip 270, the switch is opened.

The control switch 240 is in the power circuit of the clutch solenoid 134 of its dispensing mechanism and causes the clutch solenoid to be de-energized when the control switch is open and thus allows the clutch slide plate 142 to be moved to its forward position by the biasing springs 136 and 138. Such movement of the clutch slide cam to its forward position causes the pawl latch 190 to pivot in a clockwise direction, FIGURE 5, and pivot the latch 192 in a clockwise direction about its pin 193 and move it out of engagement with the teeth of the ratchet wheel 200. Simultaneously, the engagement of the extension 154 of the clutch slide cam with the extension or arm 194 of the dog 196 moves the dog 196 out of engagement with the teeth of the ratchet wheel in a clockwise manner, the force of the springs 136 and 138 being great enough to overcome the combined resistance of the springs 202 and 204 which bias the dog and the pawl toward engagement with the ratchel wheel.

Each control plate 226 is provided with a pair of horizontal slots 214 and 216 through which extend the mounting pins 218 and 220, respectively, mounted on an adjacent support plate 98. For example, the pins 218 and 220 of the dispensing mechanism 41a are rigidly secured to the support plate 98a. The pins are provided with horizontal surfaces or shoulders 218a and 220a which bear against one side of the control plate, the other vertical surface of the control plate bearing against the adjacent support plate 98. The control plate is thus held in proper position relative to the other elements of the dispensing mechanism.

The control plate 226 is reciprocated during the period of time that the drive rollers 76 of its dispensing mechanism is rotating by a gear 222 rigidly secured to a shaft 223 journaled in the plates 98a, 98b, and 98c. The gears 222 are held against longitudinal movement longitudinally of the shaft by suitable collars (not shown) rigidly secured to the shaft 223. The gear 222 of each dispensing mechanism 41a, 41b and 41c meshes with the gear 112 which drives the drive roller of its associated dispensing mechanism and each gear has a cam 224 rigidly secured thereto and rotatable about the axis of the shaft 223 therewith. The cam 224 is disposed in a cam aperture 225 of the control plate 226. The cam 224 has three radially outwardly extending projections 227a, 227b and 227c which are successively engageable with the surfaces 225a, 225b, 225c and 225d of the control plate to cause and control the reciprocal movement of the control plate.

The opposed and spaced surfaces 225a and 225c extend substantially parallel to each other and are successively engaged by the forward surfaces 227d of the cam projections to control the rearward and forward movement respectively of the control plate while opposed and spaced surfaces 225b and 225d of the control plate extend substantially parallel to each other and at an angle to the surfaces 225a and 225c and are successively engaged by the rear surfaces 227e of the cam projections to control the forward and rearward movement respectively of the control plate.

Figure 9A:
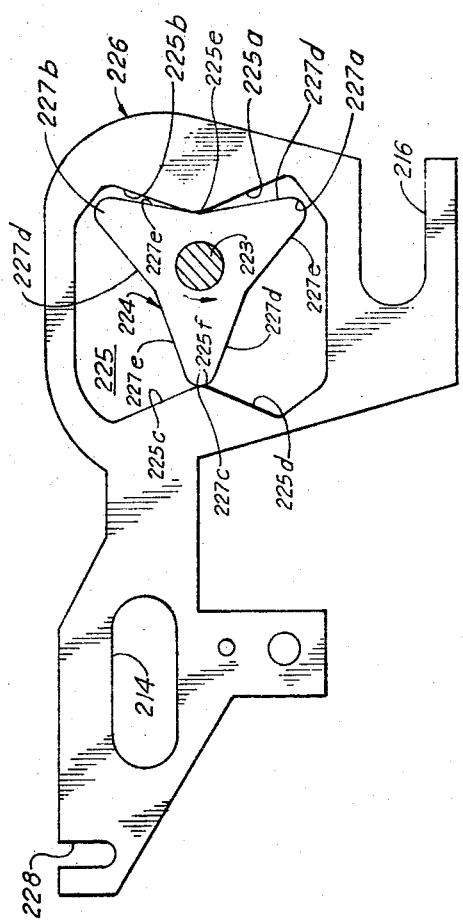
FIGURE 9a is an elevational view of a control plate and a cam for moving the cam plate of the dispensing device.

It will be apparent that if the control plate is in its extreme forward position illustrated in FIGURES 5 and 9a of the drawing, wherein the extreme edge or end surface of the cam projection 227c engages the extreme inner point or portion 225f of the control plate, and the shaft 223 is rotated in a counterclockwise direction, the forward cam surface 227d of the cam projection 227a will engage the cam surface 225a and move the plate to the right or rearwardly while at the same time the engagement of the rear cam surface 227e of the cam projection 227c with the control plate surface 225d controls the movement of the control plate to the rear and prevents it from moving more quickly than it is to be moved by the projection 227a. When the cam projection 227a has moved the control plate to its extreme rearward position, the extreme outer end surface of the cam projection 227a bears against the extreme inner point or portion 227e of the cam plate and is now in position to engage the cam surface 225b of the control plate while the cam projection 227b is now in position to engage the control plate surface 225c. As the counterclockwise rotation of the shaft 223 continues, the camming engagement of the external surfaces of the cam projection 227b with the control plate surface 225c now moves the control plate forwardly and at the same time the engagement of the external surfaces of the cam projection 227a with the surface 225b of the control plate prevents the cam plate from moving forwardly more quickly than it is to be moved by the cam projection 227d. As each cam projection 227 therefore successively engages the cam surfaces 225a, 225b, 225c, 225d, 225e and 225f of the control plate, the control plate is reciprocated in a controlled manner throughout each cycle of its reciprocation so that no undue velocity or uncontrolled movement in either direction of the control plate can take place.

The forward end portion of the control plate has an upwardly opening slot 228 in which is received the pin 230 which extends laterally from the lever 232 of any suitable counter 34 which is actuated each time its shaft 233 is oscillated through a predetermined angle. The counters 34 are mounted in the case 228 by means of a bracket 274 which extends across the upper ends of the mounting blocks 242 and is rigidly secured thereto in any suitable manner as by the screws 274a. The bracket has upwardly extending arms 275 to which the counters 34a, 34b and 34c are rigidly secured in any suitable manner as by the screws 275a.

The dials of the counters 34 are normally hidden from view through the adjacent and aligned apertures 273 of the front wall 39a of the case by a closure slide 272 to prevent unauthorized observance and knowledge of the amount of sales at a particular register. The bracket 274 has a pair of upwardly extending tabs or lugs 276 and 278 which define slots 280 in which the closure slide is movable. A plurality of slide brackets 282 are rigidly secured to the support plates 98 and define with the plate 98 downwardly opening slots 284 aligned with the upwardly opening slots 280 so that the closure slide is free to move horizontally in the slots.

The slide 272 includes a vertical substantially rectangular portion 286 in which three apertures 288 are formed. These apertures are spaced to register or be aligned with the dials of the counters 34 and with the apertures 34a of the front wall 39a to expose the dials of the counters to view. A handle 290 extends upwardly from one end of the portion 286 to which access may be had to move the closure slide between its open and closed position when the cover 30 of the case is opened or removed.

It will now be apparent that if the clutch solenoid of a particular dispensing mechanism 41A, 41B and 41C is energized, for example, the clutch solenoid 134a of the dispensing mechanism 41a, the clutch slide cam 142 is moved rearwardly by its armature 140 against the resistance of the springs 136 and 138. During this rearward movement of the armature the holding lever 210 is pivoted in a counterclockwise direction, FIGURE 5, about the axis of the shaft 212 so that its nose 211 moves out of engagement with the locking gear 110 and frees the drive roller for rotation about the axis of its shaft 102a. During such rearward movement of the armature 140 the clutch lever cam 142 is moved rearwardly and its dog 150 and lateral extension 154 move rearwardly permitting the pawl latch 190 to rotate in a clockwise direction due to the force exerted by the spring 204 through the pawl 192 so that the pawl moves into engagement with the teeth of the ratchet wheel 200 and simultaneously the dog 196 is freed for counterclockwise movement about its shaft 198 and is moved by the force of its biasing spring 202 in this direction into engagement with the ratchet wheel 200. Simultaneously, the camming engagement of the cam surface 160 of the horizontal central portion 155 of the clutch lever cam with the cam surface 165 of the clutch lever 130 pivots the clutch lever in a clockwise direction, FIGURE 7, to move the clutch plate 116 toward the gear 112 to cause engagement of their teeth 126 and 128 and thus cause the counterclockwise rotation of the drive roller 76A. During the counterclockwise rotation of the drive roller 76A, a strip of stamps is dispensed through the aperture 31a of the case and, simultaneously, the rotation of the gear 222 causes the control plate 226 to be reciprocated each time one stamp or one transverse row of stamps is issued through the aperture 31a from the roll of tape on the roller 46A. The relationships of the gear ratios of the gears 108, 112 and 222 are so chosen that the actuator lever 232 of the counter 34 of the dispensing mechanism 41a is actuated one time each time one stamp or one transverse row of stamps from the strip is dispensed through the aperture 31a. The rotation of the gear 222 now causes reciprocation of the control plate and the actuation of the counter and also causes the pawl 192 to rotate the ratchet wheel 200, and therefore the shaft 250 and the contact disk 252, through thirty degrees against the force of the spring 258 each time a single stamp or roll of tape 40A is issued through the aperture 31 of the case. The pawl 192 rides over the teeth during rearward movement of the control plate being free to pivot in a clockwise direction about its shaft 193 against the force exerted thereon by its spring 204 but clockwise rotation of the shaft 250 is prevented by the engagement of the dog 196 with the teeth of the ratchet wheel. The ratchet wheel is free to rotate in a counterclockwise direction since the dog is cammed by the teeth and pivoted in a counterclockwise direction against the resistance of its spring 202 to permit the teeth of the ratchet wheel to move thereagainst during the counterclockwise movement of the ratchet wheel. The control disk is thus rotated thirty degrees in a counterclockwise direction, FIGURE 5, each time a stamp is dispensed until the segment surface 253 of the contact disk moves into alignment and engagement with the carbon rod 268 of a preselected contact 260 thus causing a de-energization of the clutch solenoid 134A.

When the solenoid 134A is again de-energized, the force of the springs 136 and 138 moves the clutch lever cam 142 forwardly and the armature 140 forwardly to its extended position. During this movement, the holding lever 210 is pivoted in a clockwise direction about its shaft 212 and its nose or dog 211 moves into engagement with the locking gear 110 and locks the drive roller against rotation. Simultaneously, the forward movement of the clutch lever cam 142 moves its cam surface 160 forwardly permitting the clutch lever 130 to pivot in a counterclockwise direction, FIGURE 7, about its shaft or pin 132 and the force of the spring 114 is effective to move the clutch plate 116 away from the gear 112 and thus cause disengagement of the teeth 126 and 128 of the clutch plate and the gear 112, respectively. The rotation of the drive roller is immediately arrested by the holding lever 210. Simultaneously with the movement of the clutch lever 130 to its inoperative position, the pawl latch 190 is pivoted in a counterclockwise direction about its pin 191 to pivot the pawl 192 in a clockwise direction and move it out of engagement with the teeth of the ratchet wheel 200 and the lateral forward extension 154 of the clutch lever cam engages the arm 194 of the dog 196 and pivots it in a clockwise direction about its shaft or pin 198 to move it out of engagement with the ratchet wheel 200 due to the force exerted thereon by its spring 202. This frees the control switch shaft 250 for rotation in a clockwise direction and it moves the contact disk 252 back to its original position with the segment surface thereof between the contact 260 in the apertures 1 and 11 of the contact plate so that both of these contacts again engage the control strip 270.

It will now be apparent that each dispensing mechanism 41A, 41B and 41C is provided with a single solenoid 134 which simultaneously unlocks the drive roller of the mechanism for rotation, connects the drive roller through the gears 108 and 112, the clutch plate 116 and clutch lever 130 to the rotating main shaft 96, causes actuation of the counter 34 of the dispensing mechanism each time a single transverse row of stamps is dispensed from the roll 40 of the dispensing mechanism and actuates the control switch 240 and that when the control switch causes the deenergization of the solenoid, the drive roller is disconnected from the main shaft, the operation of the counter is arrested and the control switch is returned to its normal condition ready for another sequence of operation of the particular dispensing apparatus.

The control device 10 which controls the energization of the solenoids 134A, 134B and 134C and of the motor 94, includes a case or housing 299 having a base or bottom wall 300 and a cover 302 of substantially rectangular configuration. The cover has a top wall 302a, a pair of parallel side walls 302b and 302c and a pair of parallel end walls 302d and 302e. The cover is detachably secured to the bottom or base 300 by means of the screws 303, and the brackets 304 rigidly secured to the base 300 in any suitable manner. Rubber feet 310 may be rigidly secured to the bottom to protect any surfaces on which the housing may be supported.

The top wall 302a has suitable apertures through which the signal light 22 and the key operated switch 20 extend into the interior of the case. The cable 14 extends through a suitable aperture in the end wall 302d of the cover through a rubber grommet 304a which protects the cable from contact with the case. The top wall 302a of the cover 302 also has a plurality of substantially rectangular apertures or openings 306 through which the keys 16 extend and a rectangular aperture 308 through which the total key 18 extends. The total bar 18 biased upwardly toward its normal non-actuated position by a spring 312 moves the normally open switches 314a, 314b and 314c to closed position when it is depressed or actuated and holds these switches closed until the total bar is freed for upward movement and is moved upwardly by the force exerted thereon by the spring 312.

A separate switch and key assembly 320A, 320B and 320C is associated with each group 16A, 16B and 16C of the keys, respectively. The switch and key assemblies are functionally identical, the only structural differences being those necessitated by the different numbers of the keys in each group. Each switch and key assembly includes a pair of parallel spaced angle beams 322 and 324 whose outwardly extending horizontal flanges are rigidly secured, as by the rivets 324, to a top plate 326.

The shafts 329 of the keys of each switch and key assembly extend through the aligned slots 327, 331, 360, 350 and 390 of the top plate 326, the spring plate 332, the latch plate 348 and the contact plate 388, respectively. These four plates are secured together by the bolts 330 which extend through the apertures 331a of the top plate 326, the apertures 332e of the spring plate 332, the apertures 352 of the latch plate 348 and the apertures 332c of the contact plate 388. The tubular spacers 328 disposed on the shanks of the bolts 330 separate the top plate 326 from the spring plate 332, the spacers 340 separate the spring plate from the latch plate, and the washers 344, nut 346 and washer 386 separate the latch plate from the terminal plate. A washer 392 bears against the bottom side of the contact plate 388 and the nuts 394 on the lower ends of the bolts 330 secure the plates on the bolts. Each switch and key assembly is rigidly secured to the base 300 by bolts 333 which extend through suitable apertures in the base. The contact plate of each assembly is held in spaced relationship from the base by spacers 333a disposed about the shanks of the bolts and between the base and the contact plate.

The spacers 340 have reduced lower portions 342 which extend through the slots 352 of the latch plates so that the latch plates are free to move horizontally and longitudinally in the slots defined by the upper surfaces of the washers 344 and the downwardly facing annular shoulders 343 of the spacers 340 provided by the reduced portions 342 thereof.

Figure 17:
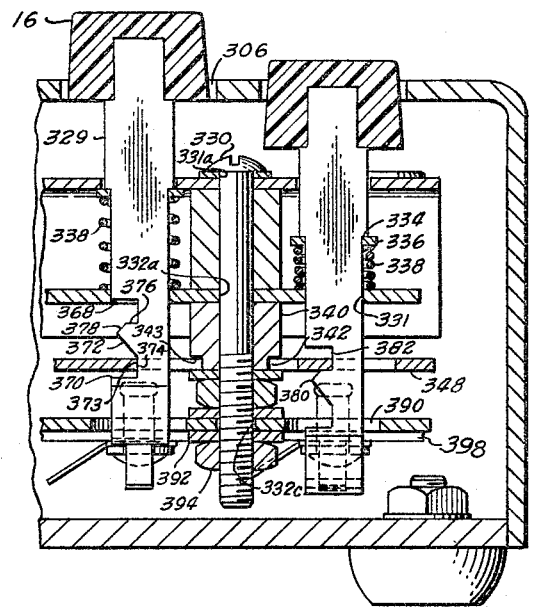
FIGURE 17 is a fragmentary sectional view taken on line 17—17 of FIGURE 14.
Figure 18:
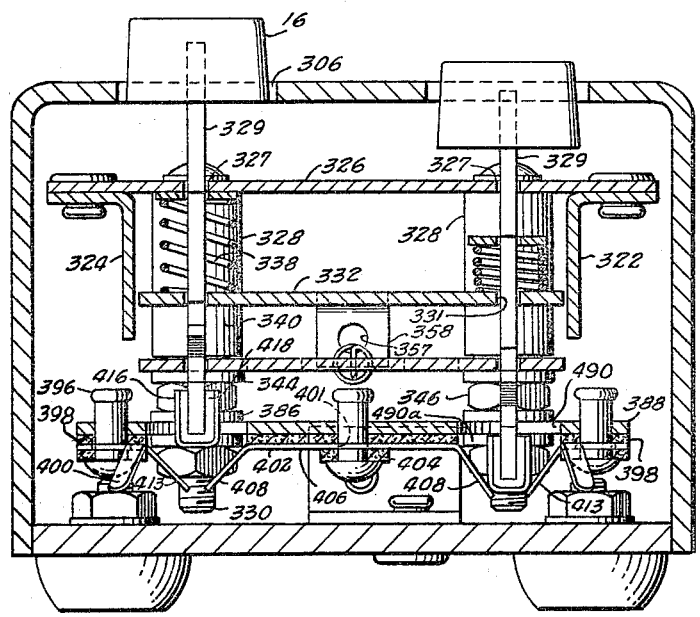
FIGURE 18 is a sectional view taken on line 18—18 of FIGURE 14.
Figure 19:
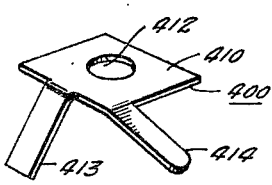
FIGURE 19 is a perspective view of an electric contact of the control device illustrated in FIGURES 14 through 18.

Each latch plate 344 has a notch 354 in one end thereof into which extends a biasing spring 356 one of whose hooked ends extends through a suitable aperture 355 of the latch plate and whose other hooked end extends through a suitable aperture 357 of a dependent end lug 358 of the spring plate 332. The shafts 329 of the keys 16 are reduced in width intermediate their ends to provide shoulders 334 which limit upward movement of the washers 336 on the key shafts. Springs 338 whose upper ends bear against the washers 334 and whose lower ends bear against the upper surface of the spring plate 332 are disposed about the shaft 329 and bias the keys upwardly. Each of the key shafts 329 is provided with upper and lower slots 368 and 370, respectively, in which is receivable the portion of the latch plate 348 adjacent the slots 350 through which the key shafts extend. The lower slot 370 has an upper shoulder 372 which extends upwardly at an angle of approximately forty-five degrees from a vertical shoulder 373 which is engageable by the edge surface or shoulder 374 of the latch plate 348 defining each shaft slot 350 to limit the horizontal longitudinal movement of the latch plate to the right, as seen in FIGURE 16, due to the force exerted thereon by the spring 356. The upper key shaft slot 368 is defined by a horizontal upwardly facing shoulder 376 and a downwardly and outwardly inclined shoulder or surface 378, and by a vertical shoulder 382 which is engageable by the shoulder 374 of the latch plate 348 when the key whose shaft extends through the particular slot 350 whose end is defined by the shoulder 374 is in its actuated or depressed position to limit horizontal longitudinal movement of the latch plate to the right as seen in FIGURES 16 and 17. When a key is in its depressed position and the platch plate is in the position illustrated in FIGURE 17, upward movement of the actuated or depressed key is prevented by the engagement of the bottom surface of the latch plate with the horizontal upwardly facing surface 376 of the shaft thereof.

When a key 16 is depressed and moved downwardly in the case against the force exerted thereon by its spring 338, the upwardly inclined cam surface 372 engages the latch plate adjacent the slot 350 through which the shaft of the key extends and cams it to the left against the force exerted on the latch plate by the biasing spring 356. When the key is depressed to the position wherein the point 380 of the key at the intersection of the surfaces 372 and 378 of the key shaft moves below the lower surface of the latch plate 348, the spring 356 moves the latch plate back to the right to its original latching position and into the upper slot 368 of the key shaft until its movement to the left is stopped by the engagement of the shoulder 374 of the shaft plate with the shoulder 382 of the key shaft. The key is now held in its lower depressed position against the force exerted thereon by its spring 338 since the bottom horizontal surface 376 of the key shaft now engages the bottom surface of the latch plate adjacent the shoulder 374 defining one end of the elongate slot 350 through which the key shaft extends. If a second key 16 which extends through another slot 350 of the same latch plate 348 is depressed, its upwardly inclined cam shoulder 372 will move the latch plate to the left against the resistance of the spring 356 until the edge 374 defining the slot 350 through which extends the shaft of the key which was first depressed moves into alignment with the downwardly inclined cam surface 378 of the key shaft of such key which was first depressed. The force of the spring 338 of such key is effective to cam the latch plate 348 further to the left and thus permit upward movement of the first key and its return to its upper non-actuated position. As a result, whenever one key of a group 16A, 16B or 16C is depressed any other key which had previously been depressed is released to move back to its upper non-actuated position.

Each of the switch and key assemblies also includes a release solenoid 362 which extends through a notch 360 of the latch plate and is secured in any suitable manner to the spring plate 332. The armature 364 of the release solenoid is connected to an upwardly extending bracket 365 secured to the latch plate 348. It will be apparent that when the solenoid 362 of a switch and key assembly 320 is energized its armature 364 moves to its left to its retracted position to move the latch plate to the left and free any key which may have been in is actuated position for upward movement to its non-actuated position. It will be apparent that the release solenoids 362 are provided to permit all keys of a switch and key assembly to be freed to move to their upper non-actuated positions without the necessity of depressing another key thereof.

A sheet or layer 398 of a suitable insulating substance and conductive contacts 400 and 402 are secured to the contact plate 388 by means of rivets 396. The rivets extend through suitable apertures 401 and 412 in the contacts 400 and 402 respectively, which are larger in diameter than the external diameters of the shanks of the rivets 396 so that the rivets do not contact the contacts 400 and 402 the heads of the rivets being held out of engagement with the contacts by the insulating washers 404. Each of the terminals 400 includes a flat portion 410 having the aperture 412 in the center thereof. A tab 413 extends downwardly and outwardly from the flat portion 410 at an angle of approximately 45 degrees into alignment with the apertures 490 and 490a of the contact plate 388 and sheet 398 through which the lower ends of the key shafts are movable downwardly. Each terminal 400 also has a tab 414 to which a conductor or lead wire is securable. The contact 402 of a conductive substance includes a flat main portion 406 which bears against the bottom side of the insulating layer 398 and has a plurality of tabs 408 which extend downwardly on each side thereof at angles of approximately forty-five degrees and also below the apertures 90 and 390a.

The tab portion of each contact 400 opposes one of the tab portions 408 of the terminal 402 below the apertures 390 and 390a and their lower ends are spaced from each other. The conductive cap 416 on the bottom end of each key shaft 329 has an insulator 418 which insulates the conductive cap 416 from the key shaft. When a key 16 is actuated or depressed, through the apertures 390 and 390a in the contact plate 388 and the insulating layer 398, it contacts a pair of the tabs 413 and 408 completing an electric circuit between one of the terminals 400 and the terminal 402. Each pair of tabs 408 and 413 and a key 16 whose cap 416 is engageable with these tabs functions as one of the groups of switches SW1A–SW9A, SW1B–SW4B and SW1C–SW10C which control the operation of the dispensing mechanisms 41A, 41B and 41C, respectively.

The switches 314A, 314B and 314C are secured to the contact plates 388 of the key and switch assembly 320B and the shaft 329a of the total bar 18 has a plate 329c rigidly secured thereto, the plate 329c being engageable with the movable contacts of the switches 314a and 314c to move them to closed positions when the total bar 18 is actuated. The bottom of the shaft engages the button 329d of the switch 314B which extends upwardly through a suitable aperture in the control plate to close the switch 314B. The shaft 329a extends through a suitable slot in the spring plate of the assembly 320B and its upward movement is limited by the engagement of the plate 329c with the bottom surface of the spring plate.

For the purposes of simplicity and clarity of explanation, electric wiring has not been shown in FIGURES 1 through 20, although many of the electric components have been illustrated. The circuit of the dispensing apparatus is illustrated in FIGURES 21 and 22 wherein any two or more individual conductors which would normally be drawn side by side are indicated by only one line. In order to simplify the schematic diagram of the electric circuit and to avoid confusion, the location of the various switches of the control device 10 illustrated in FIGURE 21 correspond to the positions of their associated keys 16 in the case 299 of the control device. Thus, nine switches SW1A–SW9A are shown which are associated with the nine keys 16A of the key and switch assembly 320A, four switches SW1B–SW4B are shown which are associated with the four keys 16B of the key and switch assembly 320B and ten switches SW1C–SW10C are shown which are associated with the ten keys 16C of the key and switch assembly 320C.

The common contacts 402 of the three key and switch assemblies are connected by a conductor 532 to one side of the key switch 20. The side of each of the switches of the three switch and key assemblies formed by the tabs 413 of the individual contacts 400 thereof are connected by individual leads to associated contacts 260 of the control switches 240A, 240B and 240C. Thus, for example, lead 501 connects the switch SW1A associated with the key 16A having the denomination 10C indicated thereon to the contact 260 located in the aperture or position 1 of the contact plate 259 of the control switch 240A. In similar fashion, the conductor 508 connects the switch SW8A associated with the key 16A having the denomination 80C indicated thereon to the terminal 260 located in the aperture or position 8 of the control switch 240A. The switches of the switch and key assembly 320B which are used to dispense stamps of the one dollar denomination are connected in a similar fashion to the contacts 260 of the control switch 240B. For example, the conductor 511 connects the switch SW1D associated with the key 16A having the denomination $1 indicated thereon to the contact 260 located in the aperture or position 1 of the contact plate 259 of the control switch 240B. The conductor 512 connects the switch SW2B associated with the $2 key 16B to the contact 260 in the aperture 2 of the contact plate of the control switch 240B and so on.

In similar fashion, the individual switches of the key and retainer assembly 320C are connected to the individual contacts 260 of the control switch 240C. Thus, the switch SW1C associated with the $5 key 16C is connected by the lead 601 to the contact 260 in the aperture or position 1 of the contact plate 259 of the control switch 240C and the switch SW10C associated with the $50 key 16C is connected by the lead 610 to the contact 260 in the aperture or position 10 of the control switch 240C.

The connection between the switches operated by the keys 16 and the contacts 260 of the control switches 240A, 240B and 240C correspond to the values represented by the individual keys, the lower value keys being connected to the contact in the first aperture or position of the contact plate and proceeding upwardly therefrom. The last used contact 260 of each of the control switches 240A, 240B and 240C is connected to one side of the switches 314A, 314B and 314C actuated by the total bar 18. Thus, the conductor 540 connects the contact 260 in the aperture or position 10 of the contact plate of control switch 240A to one side of the switch 314A, the conductor 541 connects one side of the switch 314B to the contact 260 in the aperture or position 5 of the contact plate of switch 240B, and the conductor 542 connects one side of the switch 314C to the contact in the aperture or position 11 of the contact plate of the switch 240C.

The conductors 540, 541 and 542 also connect the switches 314A, 314B and 314C, respectively, to the terminals F of the relays 670A, 670B and 670C, respectively. The other sides of the switches 314A, 314B and 314C are connected to the coils of the three relays 670A, 760B and 670C, respectively. Thus, the conductor 524 connects the switch 314a to one side of the relay 670A, the conductor 525 connects the switch 314B to one side of the coil of the relay 670B and the conductor 526 connects the switch 314C to one side of the coil of the relay 670C. The conductors 524, 525 and 526 are also connected to the stationary contacts G of the relays 670A, 670B and 670C, respectively. The other sides of the coils of the relays 670 are connected by the conductor 700 to the movable contact A of a relay 543. The stationary contact B of the relay 543 is connected to the one side of the secondary winding 663 of the transformer 661 by the conductor 702. The conductor 700 is also connected to the anodes of the diodes 690A, 690B and 690C and the conductor 702 is also connected to the conductive spring levers 69A, 69B, and 69C of the support assemblies 45A, 45B and 45C which support the rolls of tape 40A, 40B and 40C, respectively. The other side of the secondary winding 663 of the transformer 661 is connected by the conductors 672 to one side of each of the three capacitors 680A, 680B and 680C. This other side of the secondary winding is also connected by the conductor 530 to one side of each of the lock switch 20, the lamp 22, the other side of the coil of the holding relay 543, and one side of each of the release solenoids 362A, 362B and 362C. The other sides of the capacitors 680A, 680B and 680C are connected by the conductors 674, 676 and 678, respectively, to the terminals B of the relays 670A, 670B and 670C, respectively. The conductors 527, 528 and 529 connect the other sides of the release solenoids 362A, 362B and 362C to the contacts A of the relays 670A, 670B and 670C, respectively. The primary winding 662 of the transformer 661 is connected through the fuses 660 and 659 to the two conductors of the cord 36 and the prongs 38a and 38b of the plug 38 so that the primary winding is energized when the male plug 38 of the cord 36 is inserted in a suitable female electrical convenience outlet.

The conductor 680 connects the prong 38a of the plug 38 to the movable contacts 182 of the clutch solenoid operated switches 186A, 186B and 186C and to the movable contacts D of the relays 670A, 670B and 670C. The other prong 38b of the male plug 38 is connected to one side of the motor 94 and to one side of each of the clutch solenoids 134A, 134B and 134C by the conductor 682. The cathodes of the diodes 690A, 690B and 690C are connected by the conductors 692, 694 and 696, respectively, to the contacts C of the relays 670A, 670B and 670C, respectively. The conductive rollers 46A, 46B and 46C are connected by the conductor 531 to the coil of the holding relay 543 and to the other side of the lamp 22.

Assuming now that the switch is closed and the male plug is inserted into a female receptacle of conventional type thus connecting the primary winding 662 and the conductor 680 and 682 across the source of electrical power and that a sale of $31.50 has been made and it is desired to dispense stamps of total face amount corresponding to this amount, the $30 key 16C is depressed closing the switch SW6C, the $1 key 16B is depressed closing the switch SW1B and the 50¢ key 16A is depressed closing the switch SW5A. Since the switch 20 is now closed, the common contacts 402 of the switch and key assemblies 320A, 302B and 320C are connected to one side of the secondary winding 663 and the now closed switch and the conductor 505 provide a conductive path to the contact 260 in the aperture 5 of the contact plate 259 of the control switch 240A. As this contact is now engaged with the contact strip 270 of the contact disk 252 of the control switch 240A, a conductive path is provided by the conductive strip 270 to the contact 260 in the aperture 10 of the contact plate of the switch 240A and thence by the conductor 540 to the movable contact of the switch 314A. During the short period of time that the switch 314A is closed by the depression of the total bar 18, conduction is permitted by the conductor 524, connected to the stationary contact of the switch 314A to one side of the coil of the relay 670A and to the stationary contact G thereof. The other side of the coil of the relay 670A is now connected by the conductor 700 to the normally closed contact C1 of the relay 543 and the conductor 702 to the other side of the secondary winding 663. When the coil of the relay 670A is thus energized, movable contacts B, D and F are moved to engage their associated stationary contacts C, E and G as the movable contact is connected to the line 540 and the movable contact B moves out of engagement with the stationary contact A. The coil of the relay 670A will remain connected across the secondary winding 663 even when the total bar 18 is released and the switch 314a opens since the contact F is connected to the conductor 540. One side of the motor 194 and one side of each of the clutch solenoids 134A, 134B and 134C is now connected to the prong 38b of the plug 38. The other side of the clutch solenoid 134A is connected to the contact 38a of the plug 38 through the contacts D and E of the relay 270A, which are now in engagement, and the conductor 684. The clutch solenoid 134A is now energized and moves to its retracted position causing the movable contact 182 of its switch 186A to engage the stationary contact 184 thus connecting the other side of the motor to the prong 38a of the plug 38, through the leads 710 and 711. When the clutch solenoid 134A of the dispensing mechanism 141a is energized it moves the holding lever out of engagement with the locking gear 110, as described above, and also moves its clutch lever cam 142 rearwardly causing the clutch lever 130 to move the clutch plate 116 into engagement with the gear 112 thus causing the drive roller 76A to rotate and simultaneously causing the control plate 226 to reciprocate each time a stamp is moved through the dispensing aperture 31a and actuate the counter one step during each such reciprocation thereof rotating the control shaft 250 of the control switch 240 through thirty degrees during each such reciprocation.

When the cam control plate 226 has been reciprocated five times and five of the 10¢ stamps have been issued through the dispensing aperture 31a, the counter 34a will have been advanced five digits and the switch 240a will have been rotated through 150 degrees so that the segment surface 253 of the contact disk 252 moves into alignment with the contact 260 disposed in the aperture or position 5 of the contact plate 259 thereof so that the switch 240A now opens. When the switch 240A opens, power is removed from the contact F causing the coil of the relay 670A to be disconnected from the secondary winding. When the coil of the relay 670A is de-energized, the movable contact D moves to its open position and out of engagement with the stationary contact E and the clutch solenoid 134A is thus de-energized. When the solenoid 134A is de-energized, the movable contact 182 of its associated switch 186A moves to its open position as the armature 140 of the clutch solenoid is moved to its extended forward position by the springs 136 and 138, the clutch lever cam 142 is moved forwardly permitting the clutch plate 116 to move away from the gear 112 and thus disconnecting the drive roller 76A from the main shaft 96 and the holding lever is moved into engagement with the locking gear so that the rotation of the drive roller is arrested immediately upon the de-energization of the solenoid. At the same time, the pawl 192 and the dog 196 are moved out of engagement with the ratchet wheel 200 so that the shaft 250 may rotate back to its original position.

A similar sequence of events occurs in connection with the dispensing mechanism 16B. As the $1 key 16B has been depressed, the switch SW1B is closed applying power through the conductor 510 to the contact 260 and the aperture or position 1 of the contact plate of the control switch 240B of the dispensing mechanism 41B. The contact 260 in the position 5 on the contact plate 259 of the control switch 240B, which is always in engagement with the contact strip 270, is connected by the conductor 541 to one side of the switch 314B so that when the total bar 18 is depressed, power is supplied through the conductor 525 to one side of coil of the relay 670B. As the other side of the coil of the relay 670B is connected to one side of the secondary windings 663 through the conductor 700, the normally closed contacts C and B of the relay 543 and the conductor 702, the coil of the relay 670B will be energized as described before with reference to relay 670A. The relay 670B incorporates the holding contact F which engages the stationary contact G to maintain the coil of the relay winding 670B energized when the switch 314B is opened upon the release of the total bar 18 for movement to its upper position. The sequence of operations thereafter of the dispensing mechanism 41B is the same as described with reference to the issuance of the stamps of ten cent denomination by the dispensing mechanism 41A except that the control switch 240B will open after only one cycle of operation of the control plate 226 and only one stamp of $1 denomination will be issued.

The depression of the $30 switch 16C closes the switch SW6C and applies power to the contact 260 at the position 6 of the control switch 240C through the conductor 606 since the contact 260 at the position 11 of the contact plate of this control switch which is always in engagement with the contact strip 270 is connected by the conductor 542 to one side of the switch 314C. The other side of the switch 314C is connected by the conductor 526 to the coil of the relay 670C causing it to be energized when the switch 314C is momentarily closed. The energization of the winding of the relay 670C causes the clutch solenoid 134C to be energized and remain energized until the control plate 226 of the dispensing mechanism 41c completes six cycles of reciprocation at which time the counter 34C will have been advanced or actuated six digits and the control switch 240C will have been moved through 180 degrees causing the segment surface 253 of the contact disk of the switch 240C to move into alignment with the terminal 260 in the position or aperture 6 of the contact plate thereof so that the switch 240C is then opened.

The three dispensing mechanisms are simultaneously energized so that stamps of all three denominations are issued concurrently but obviously since the gear ratios of these three dispensing mechanisms are identical, it will require each dispensing mechanism a longer period of time to issue six stamps than is required to issue one stamp. In this specific example, the relay 670C will remain energized longer than either of the relays 670A or 670B. The motor, however, will be driven as long as one or more of the relays 670 are energized so that the successive de-energization of the relay 670B and then 670A will have no effect upon the operation of the motor 94 which will continue to run until the relay 670 C opens.

In order to cause the keys 16 to return to their upper inoperative or non-actuated positions after each operation of the dispensing device, the capacitors 680A, 680B and 680C are provided to momentarily energize the release solenoids 362A, 362B and 362C. One side of each of the capacitors 680a, 680b and 680c are connected to the contacts B of the relays 670A, 670B and 670C, respectively by the conductors 674, 677 and 678, respectively, while their other sides are connected to one side of the secondary winding 663 by the conductor 672 so that whenever a relay to which a particular capacitor is connected is energized, a charging path for the capacitor is provided through the contacts B and C of the relay, its associated diode 690, the conductor 700, the contacts C and B of the relay 543 and the conductor 702. When the relay 670 which provides a charging path is de-energized, its contact B will move out of engagement with its contacts C and into engagement with its contact A to connect the capacitor across its associated release solenoid 362 to momentarily energize the release solenoid and cause it to move the latch plate 348 to the left as seen in FIGURE 16 to release any key which may have been held in its actuated position thereby to its upper non-actuated position.

Means are also provided to disable or render inoperative dispensing apparatus in the event that the supply of one or more denominations of the stamps is exhausted. As previously described, a spring loaded conductive lever or spring 69 bears against the outer peripheral surface of each roll 40A, 40B or 40C of the stamps. Each of the conductive levers 69A, 69B and 69C is connected by the conductor 702 to one side of the secondary winding 563 and their associated conductive rollers 46A, 46B and 46C are connected by the conductor 531 to one side of the coil of the relay 543 and to one side of the lamp 22. The conductor 530 connects the other side of the lamp 22 and the other side of the relay to the other side of the secondary winding 663. When the roll of stamps is exhausted, the conductive spring will bear against the conductive roller 46 on which that roll of stamps had been mounted causing the light 22 to be energized and at the same time causing the relay winding 543 to be energized. When the relay 543 is energized, its contact C moves out of engagement with its stationary contact B which thus disconnects the relay windings 670A, 670B and 670C from the transformer winding and, since the control mechanism can operate only when the relay winding 543 is not thus energized, the dispensing apparatus is effectively disabled or rendered inoperative until such time as the contact between such conductive roller 46 and its conductive lever 69 is broken by the mounting of a new roll of tape thereon.

In some instances, due to the particular needs, it is desirable to use stamps of only one denomination. The particular denomination chosen is usually 10¢ to allow stamps to be given for small purchases. Obviously, if $10 or $20 in face value of stamps were issued to a customer, using a roll of 10¢ stamps only one stamp wide, it would be necessary to issue a tape of considerable length. This problem is usually overcome by issuing the stamps in a tape that is perforated both laterally and longitudinally. For example, the tape may comprise transverse rows of five stamps each. If two rows of stamps in a five stamp wide row are issued, a total of ten stamps or $1 of value will be issued. The present apparatus is readily adaptable to such an operation. The roller 46 of the support assembly 45 which carries the roll of stamps five stamps wide must, of course, be widened to accommodate the greater width. In similar fashion, the drive roller 76, the feed chute 86 and the aperture 31 through which the stamps must issue must be made to conform to the size of the roll of the width of the stamps. If the drive wheel 76 is to issue two rows of stamps rather than one row of stamps each time its control switch 240 is rotated through thirty degrees, the gear ratios between the gears 108 and 112 and 222 must now be adjusted accordingly.

Figure 23:
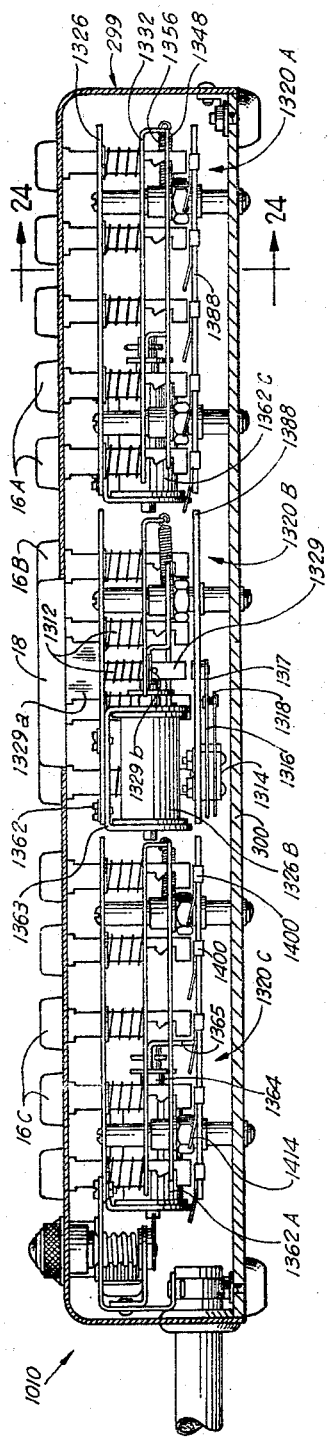
FIGURE 23 is a side view of a modified form of the control device for controlling operation of the dispensing device.
Figure 25:
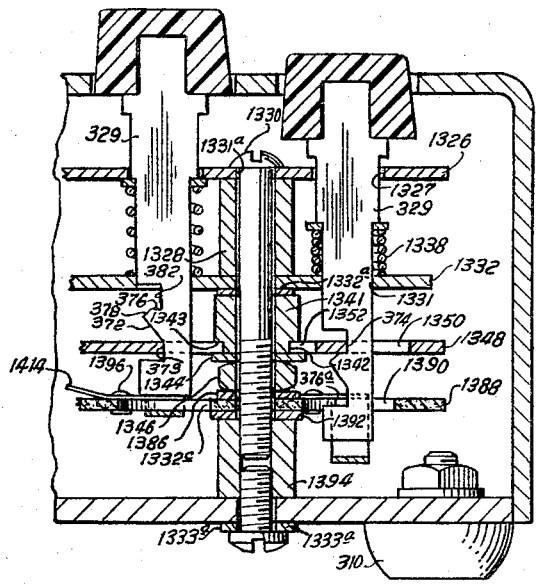
FIGURE 25 is a vertical sectional view taken on line 25—25 of FIGURE 23.
Figure 24:
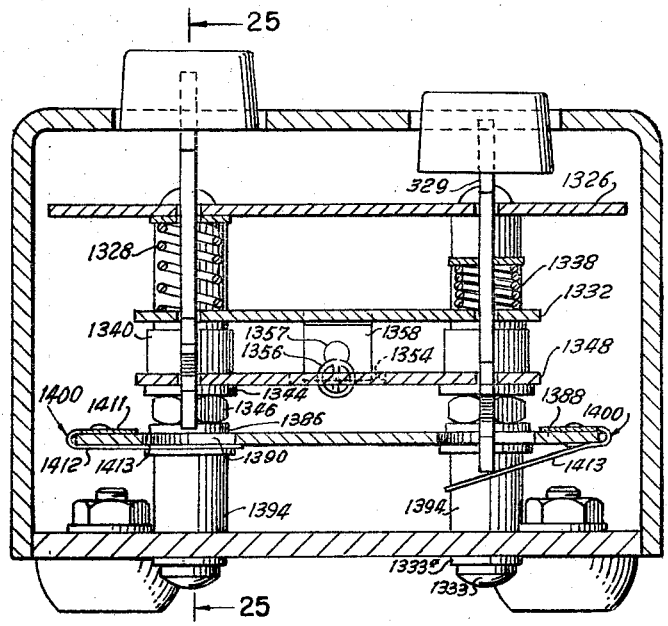
FIGURE 24 is a fragmentary sectional view taken on line 24—24 of FIGURE 23.

The control device 1010 illustrated in FIGURES 23, 24 and 25 is a modified form of the control device 10 and accordingly elements of the control device 1010 have been provided with the same reference numerals, to which the prefix 1 or 10 has been added to make each reference numbered a four digit number. The case and the keys of the control device 1010 being identical in all respects except for the omission of the insulating layer 418 and the cap 416 from the keys, have the same reference numerals applied thereon as the case and the keys of the control device 10.

The total bar 18 has a shaft 1329 which extends through aligned slots in the top and spring plates 1326 and 1322 of the switch and key assembly 1320A and is biased upwardly by a spring 1312 disposed about the shaft and whose opposite ends bear against the spring plate and the downwardly facing shoulder 1329a provided by the enlarged upper end portion of the shaft. Upward movement of the total bar is limited by the engagement of the pin 1329b secured to the lower end of the shaft with the bottom surface of the spring plate. When the total bar is depressed, the lower end of its shaft closes the switch 1314 mounted on the contact plate 1388 of the assembly 1320B by engaging the lug 1317, which extends upwardly through a suitable aperture of the contact plate, of the movable contact 1316 of the switch and moving it into engagement with the stationary contact 1318 thereof.

The switch and key assemblies 1320A, 1320B and 1320C are functionally identical, the only structural differences being those necessitated by the different numbers and positions of the keys 16 in each group 16A, 16B and 16C of the keys. The shafts 329 of the keys of each switch and key assembly extend through the aligned slots 1327, 1331, 1350, and 1390 of the top plate 1326, the spring plate 1332, the latch plate 1348 and the contact plate 1388 thereof. These four plates are rigidly secured to one another by the bolts 1330 which extend through the apertures 1331a of the top plate, the apertures 1332a of the spring plate, the apertures 1352 of the latch plate and the apertures 1332c of the contact plate. The tubular spacers 1328a disposed on the shanks of the bolts separate the top plate from the spring plate, the spacers 1340 separate the spring plate from the latch plate and the washers 1344, the nuts 1346 and the washers 1386 separate the latch plate from the contact plate. The washer 1392, bearing against the bottom side of the contact plate, and the nuts 1394 on the bolts secure the plates to one another and on the bolts. Each switch and key assembly is rigidly secured to the base 300 of the case by the screws 1333 which are threaded into the nuts 1394, the nuts 1394 also acting as spacers to hold each switch and key assembly properly spaced above the base 300. Washers 1333*a* may be interposed between the heads of the screws 1333 and the base.

The spacers 1340 have reduced lower portions 1342 which extend through the slots 1352 of the latch plates so that the latch plates are free to move horizontally and longitudinally in the slot defined by the upper surfaces of the washers 1344 and the downwardly facing annular shoulders 1343 of the spacers 1340 provided by the reduced portions 1342 thereof. The latch plates of the three switch and key assemblies 1320A, 1320B and 1320C are of substantially the same structure as the latch plates of the corresponding assemblies 320A, 320B and 320C, each latch plate 1348 having a notch 1354 in one end thereof through which extends a biasing spring 1356, one of whose hooked ends extends through a suitable aperture of the latch plate and whose other hooked end extends through a suitable aperture 1357 in a dependent end lug 1358 of the spring plate of its assembly. The release solenoid 1362 of each assembly extends through a suitable end slot S of the spring and latch plates and is secured by a bracket 1363 and the usual screws 1363*a* to the top plate. The armature 1364 of the release solenoid is secured to the upwardly extending lug 1365 of the latch plate so that when the solenoid 1362 is energized it moves its associated latch plate 1348 to the left, as seen in FIGURE 23, to free any key which may be held in its actuated position by the latch plate for upward movement to its non-actuated position.

Conductive contacts 1400 are secured to the contact plate 1388 which is of an electrically non-conductive or insulating substance by means of the rivets 1396. Each of the contacts 1400 has a substantially U-shaped main portion 1404 which is slidable over a side edge of the contact plate 1388, having parallel spaced flanges 1411 and 1412 which abut top and buttom surfaces of the contact strip. A spring tab 1413 of each contact extends across an associated aperture 1390 of the contact plate through which the lower end of the shaft 329 of an associated key is movable downwardly for engagement therewith so that an electric contact may be established between the contact 1400 and the shaft of the key switch. The contacts 1400 also have tabs 1414 to which a conductor or lead wire is securable. The key of each shaft is grounded to the case since the springs 1338, washers 1336, the top plate and the base 300 are of a conductive substance. Each tab 1413 and its associated key 16 function as one of the switches of the groups of switches SW1A–SW9A, SW1B–SW4B and SW1C–SW10C which controls the operation of the dispensing mechanisms 41A, 41B and 41C, respectively.

Figure 26:
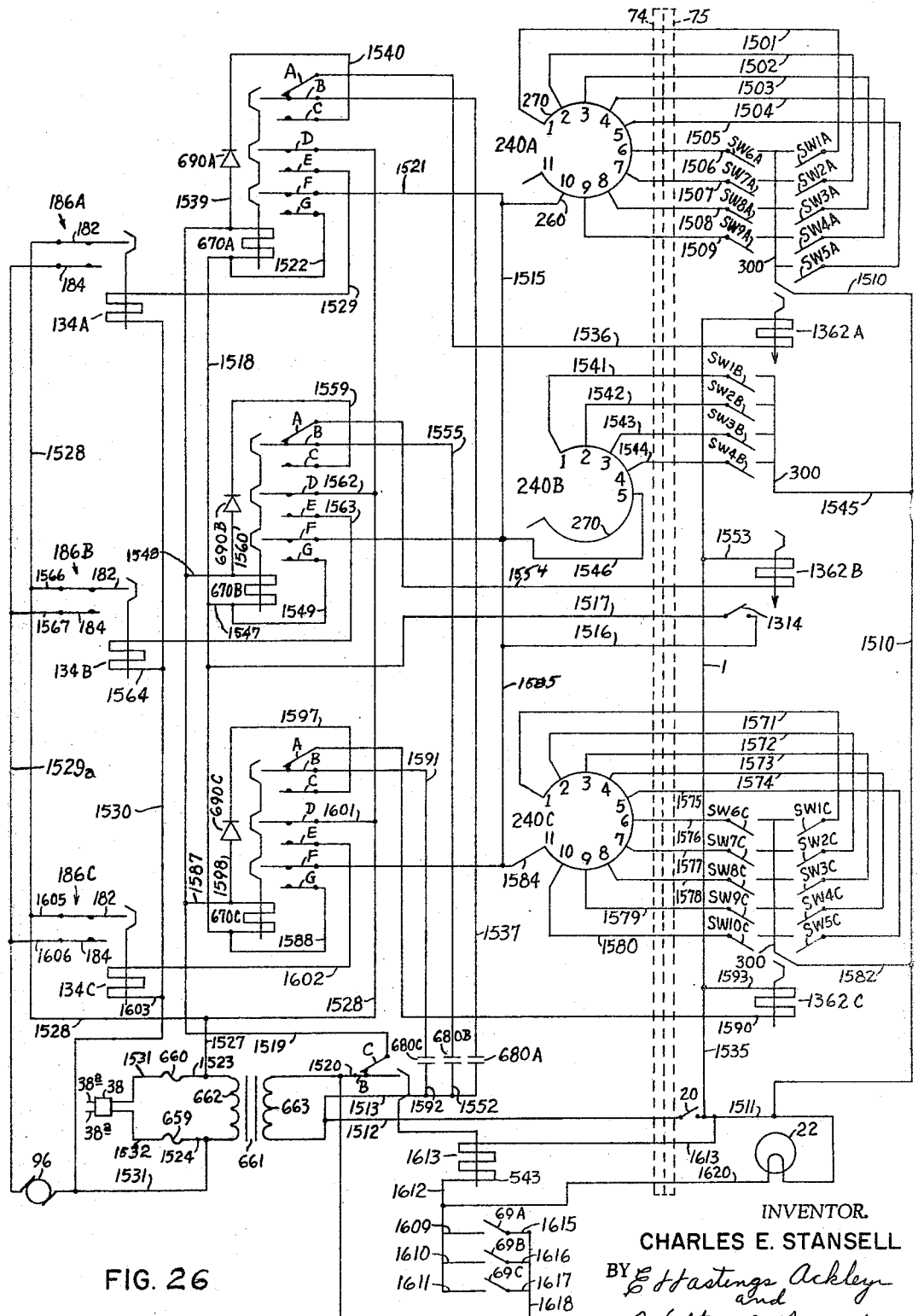
FIGURE 26 is a schematic illustration of the electric circuit of the dispensing apparatus employing the modified form of the control device illustrated in FIGURES 23 through 25.

Referring now to FIGURE 26, the schematic illustration of the electric circuit shows the manner in which the modified form of the control device 1010 is employed to control the operation of the stamp dispensing device 12.

The tabs 1414 of the contacts 1400 each of which constitutes one side of each of the switches SW1A–SW9A of the switch provided by the switch and key assembly 1320A, which controls operation of the dispensing mechanism 41A, are connected to the contacts 260 of the control switch 240A in the positions 1 through 9 of the contact plate 259 thereof by the conductors 1501–1509, respectively, while the other sides of these switches are connected to one side of the secondary winding 663 of the transformer 661 of the dispensing device 12 through the keys 16A which constitute components of the switches SW1A–SW9A, the various metal elements of the switch and key assembly 1320A and the base of the case, the conductor 1510 which is connected to the case 299 in any suitable manner, the conductor 1511, the key switch 20 and the conductors 1512 and 1513. The common contact 260 of the control switch 240A which is in the position on the contact plate 259 thereof is connected to the other side of the secondary winding 663 through the conductors 1515 and 1516, the switch 1314, the conductor 1519, the contacts B and C of the holding relay 543. It will be apparent that the switches SW1A–SW10A are connected in series with the control switch 240A, the total switch 1314, the coil of the relay 670A, and the key switch 20 across the secondary winding 663 so that when any one of the switches SW1A–SW9A is in its closed position and the total bar 18 is depressed to close the total switch 1314, the coil of the relay 670A is energized. To maintain the relay winding 670A energized after the momentarily closed total switch 1314 opens, F and G of the relay 670A which are moved into engagement when the coil of the relay winding 670A is energized are connected across the total switch 1314, the movable contact F being connected to the common contact 260 of the control switch 240A by the conductors 1521 and 1515 and the stationary contact G being connected to the conductor 1518 by the conductor 1522. The movable and stationary contacts D and E, respectively, of the relay 670A are moved into engagement to connect the clutch solenoid 134A of the dispensing mechanism 41A across the power or main conductors 1523 and 1524 by the conductors 1527, 1528, 1529, 1530 and 1531.

The main conductors 1523 and 1524 are connected to the prongs 38*a* and 38*b* of the plug 38 by the fuse 660 and the conductor 1532 and by the fuse 659 and the conductor 1532, respectively. Normally closed contacts A and B of the relay 670A connect the capacitor 680A across the latch release solenoid 1362A through the conductors 1513, 1512, 1535, 1536 and 1537. When the relay winding 670A is energized, the movable contact B of the relay winding 670A moves out of engagement with the contact A and into engagement with the stationary contact C thereof to connect the capacitor 680A across the secondary winding 663 through the conductor 1520, the normally closed contacts C and B of the holding relay 543, the conductors 1519 and 1539, the diode 690A and the conductors 1540 and 1537. It will thus be apparent that when the relay winding 670A is energized the capacitor 680A is charged and that when the relay winding 670A is thereafter de-energized, the movable contact B of the relay 270A moves into engagement with the stationary contact A to connect the now charged capacitor across the latch release solenoid 1362A and thus causes the discharge of the capacitor 680A to cause a momentary surge of current to flow through the latch release solenoid. The latch release solenoid when thus energized moves the latch plate 1348 of the key and switch assembly 1320A to the left against the resistance of the spring 1356 to release any key 16A of the key and switch assembly 1320A which is in its actuated or depressed position for movement to its upper non-actuated position and thus open the switch SW1A–SW9A controlled by such key.

The clutch solenoid 134A when energized moves the movable contact 182 of the motor switch 186A into engagement with its stationary contact 184 to connect the motor 96 of the dispensing device across the main conductors 1523 and 1524 by means of the conductors 1527, 1528, 1526 and 1531.

It will now be seen that if one of the keys of the key and switch assembly 1329A is depressed and held in its closed position by the latch plate 1348, for example, the 50¢ key 16A which closes the switch SW5A, and the total bar 18 is momentarily depressed to close the total switch 1314, the coil of the relay 670A is immediately connected across the secondary winding through the closed key switch 20, the switch SW5A, the now closed switch 240A, the total switch 1314, and the closed contacts of the holding relay 543. The energization of the relay 670A causes the movable contact F to engage its stationary contact G and short circuit the total switch 1314 to hold the coil of the relay winding 670A connected across the secondary winding 653 even though the total switch 1314 opens as long as the switch 240A is closed. The coil of the relay winding 670A is then connected across the secondary winding through the switches 20, SW5A, 240A, the now closed contacts F and G of the relay 670A and the closed contacts C and B of the relay 543. The energization of the relay 670A causes the clutch lever solenoid 134A to be energized which in turn causes the motor switch 186A to close and the motor 96 to be energized. When the relay 670A is energized, its contact B is moved out of engagement with its stationary contact A, thus disconnecting the latch release solenoid 1362A from across the capacitor 680A, and into engagement with its contact C to connect the capacitor 680A across the secondary winding through the diode 690A and the closed contacts C and B of the holding relay 543 so that the capacitor is charged during the period of time that the relay 670A is energized.

The relay 670A remains energized until the contact disk 252 of the control switch 240A is rotated through 150 degrees and the surface segment 253 moves into alignment with the contact 260 in the position 5 to open the control switch 240 whereupon the coil of the relay winding 670A is disconnected from the secondary winding 663. Upon the de-energization of the relay winding 670A, the contacts D and F move out of engagement with the contacts E and G, respectively, causing de-energization of the clutch lever solenoid 134A and the opening of the switch 186A so that, if the switch 186A had been the only closed one of the switches 186A, 186B and 186C, the motor stops running. Upon the de-energization of the coil of the relay winding 670A, its movable contact B also moves out of engagement with the contact C thus disconnecting the capacitor 680A from across the secondary winding and connecting it across the latch release solenoid 1362A so that the discharge of the capacitor 680A through the latch release solenoid causes the latch plate 1348 to move to the left to release the key 16A of the switch SW5A for movement to its upper open position thus opening the switch SW5A when the key moves to its upper position and the capacitor is fully discharged, the force of the spring 1356 moves the latch plate back into latching engagement holding all keys in their upper non-actuated positions. When the switch SW5A is thus opened, the coil of the relay 670A will not again be energized as the switch 240A is again closed as the spring 258 rotates the contact disk 252 thereof back to its original position where all contacts 260 are in engagement with the contact strip 270. The coil of the relay 670A can then be energized again only by again closing one of the switches SW1A–SW9A and the total switch 1314.

One side of each of the switches SW1B–SW4B of the switch and key assembly 1320B is connected to the contacts 260 of the control switch 240B of the dispensing mechanism 41B in the positions 1, 2, 3 and 4, respectively, of the contact plate 259 thereof by the conductors 1541, 1542, 1543 and 1544, respectively. The other sides of the switches SW1B–SW4B are connected to the one side of the secondary winding 663 through the key shafts and metal elements of the assembly and the base 300, the conductor 1545, the conductors 1510 and 1511, the key switch 20 and the conductors 512 and 513.

A holding circuit for holding the coil of the relay 670B energized after the switch 1314 opens after being momentarily closed is provided by the contacts F and G of the relay 670B which are connected across the total switch by the conductors 1546, 1515, 1516, 1517, 1518, 1547 and 1549.

When the coil of the relay 670B is not energized, the latch release solenoid 1362B of the switch and control assembly 1320B is connected across the capacitor 680B by the conductors 1552, 1513 and 1512, the key switch 20, the conductors 1525, 1553, 1554, the closed contacts A and B of the relay 670B and the conductor 1555. When the relay winding 670B is energized and the movable contact B is out of engagement with the contact A and in engagement with the contact C of the relay 670B, the capacitor 680B is connected across the secondary winding 663 by the conductors 1555 and 1559, the diode 690B, the conductors 1560, 1548, and 1519, the closed contacts of the holding relay 543 and the conductors 1520, 1513 and 1552. When the relay 670B is energized, the clutch lever solenoid 134B of the dispensing mechanism 41B is connected across the main conductors 1523 and 1524 by the conductors 1527, 1528 and 1562, the contacts D and E of the relay 670B which are now in engagement, the conductors 1563, 1530 and 1531. The clutch lever solenoid 134B when energized causes the movable contact 182 of its associated motor switch 186B to move into closed position or engagement with its stationary contact 184 to connect the motor 96 across the main conductors 1523 and 1524 through the conductors 1527, 1528, 1566, 1567, 1529 and 1531.

One side of each of the switches SW1C–SW10C is similarly connected to the contacts 260 in the positions 1 through 10, respectively, of the contact plate 259 of the control switch 240C of the dispensing mechanism 41C by means of the conductors 1571–1580, respectively, it being apparent that each of these conductors has one end connected to its associated contact 260 and its other end connected to the tab 414 of the contact 1400 which is engageable by the shaft of its associated key 16C. The other sides of these switches are connected to one side of the secondary winding 663 through the key shaft and metal elements of the switch and key assembly 1320C, the case 300 and the conductors 1582, 1510, 1511, the key switch 520 and the conductors 1512 and 1513. The common contact 260 of the control switch 140C in the position 11 of the contact plate thereof is connected to the other side of the secondary winding by the conductors 1584, 1585, 1516, the total switch 1314, the conductors 1517, 1518, 1587, 1519, the closed contacts of the holding relay 543 and the conductor 1520. When one of the switches SW1–SW10 and the control switch 240 are closed and the coil of the relay winding 670C is energized, the contacts F and G thereof are in engagement and connected across the total switch by the conductors 1584, 1588, 1518 and 1517 and 1516 so that when the total switch opens after being momentarily closed, the coil of the relay 270C will remain connected across the secondary winding if the contact switch 240C and any one of the switches SW1C–SW10C are closed.

The latch release solenoid 1362C of the switch and key assembly 1320C is connected across the capacitor 680C when the relay 670C is not energized through the conductor 1590, the closed contacts A and B of the relay 670C, the conductors 1591, 1592, 1513, 1512, the key switch 20, the conductors 1511, 1535 and 1593. When the relay winding 670C is energized, the capacitor 680C is connected across the secondary winding by the conductors 1513, 1592, 1591, the contacts B and C of the relay 670C which are now in engagement, the conductor 1597, the diode 690C and the conductors 1598, 1587 and 1519, the closed contacts of the holding relay 543 and the conductor 1520.

The coil of the relay 676C is connected across the main conductors 1523 and 1524 by the conductors 1527, 1528, 1601, the now closed contacts D and E of the relay 670C and the conductors 1602, 1603, 1530 and 1531.

The clutch lever solenoid 134C when energized moves the movable contact 182 of the motor switch 186C into engagement with the stationary contact 184 thereof to connect the motor 96 across the main conductors 1523 and 1524 by means of the conductors 1527, 1528, 1605, 1606, 1529a and 1531.

The rollers 46A, 46B and 46C are connected by the conductors 1609, 1610, and 1611, respectively, to the common conductor 1612 which is connected to one side of the coil of the holding relay 543. The other side of the coil of the holding relay is connected to one side of the secondary winding 663 by means of the conductors 1613 and 1511, the switch 20, the conductors 1512 and 1513. The springs or levers 69A, 69B and 69C of the support assemblies 45A and 45B and 45C which are engageable with their respective rollers 46A, 46B and 46C are connected by means of the conductors 1615, 1616 and 1617, respectively, to a conductor 1618 which is connected to the other side of the secondary winding 663 through the conductor 1520. It will be apparent that whenever the roll of tape on one of the supply rollers is exhausted, its associated spring lever will engage such roller and connect the coil of the holding relay across the secondary winding 663 thus causing its movable contact B to move out of engagement with its stationary contact C. When the contact C is open, the relays 670A, 670B and 670C cannot be energized even if any one of the keys 16 and the total bar 18 are depressed so that the dispensing device cannot be operated until a new roll of stamps is placed on such roller and holds the spring or lever 69 associated therewith out of engagement with the roller.

The signal lamp 22 is energized whenever any one of the spring levers engages its roller being then connected across the secondary winding through the conductors 1513 and 1512, the key switch 20, the conductors 1511, 1620 and 1612, one of the conductors 1609, 1610 and 1611, one of the rollers 46A, 46B and 46C, one of the levers 69A, 69B and 69C, one of the conductors 1615, 1616 and 1617, and the conductors 1618 and 1520. It will thus be apparent that the signal lamp or light 22 gives a visual indication that the dispensing apparatus is inoperative and that the supply of stamps of at least one of the rolls 46 has been exhausted.

In use, if the key switch 20 is closed and the plug 38 is inserted into a female receptacle of a conventional type, thus connecting the main conductors 1523 and 1524 and the primary winding 662 of the transformer 661 to a source of alternating current, and assuming that a sale of $31.50 has been made and it is desired to dispense stamps of the total face amount corresponding to this amount, the $30.00 key 16C is depressed closing the switch SW6C, the $1.00 key 16B is depressed closing the switch SW1B and the 50¢ key 16A is depressed closing the switch SW5A. As each of these keys is depressed against the resistance offered by its spring, its upper shoulder 372 engages the edge surface or shoulder of its latch plate 1348 defining the slot 1350 through which the shaft 329 of such key extends and the camming engagement between these shoulders moves the latch to the left, FIGURE 23, until the point 380 of the key shaft moves out of engagement with such shoulder 1374. When each key is depressed to the position wherein the point 380 of its shaft 329 at the intersection of the surfaces 372 and 378 thereof moves below the lower surface of the latch plate 1348, the spring 1356 moves the latch plate back to the right to its original latching position and into the upper slot 1368 of the key shaft until its movement to the left is stopped by the engagement of the shoulder 1364 of the latch plate with the shoulder 382 of the key shaft. Each actuated key is now held in its lower depressed position against the force exerted thereon by the spring 338 since the bottom horizontal surface 376 of the key shaft now engages the bottom surface of the latch plate adjacent the shoulder 1374 defining such one end of the elongate slot 1350 through which the key shaft extends. These keys are now held in their depressed positions holding the switches SW5A, SW1B and SW6C in their closed positions and since the common contacts 260 of the control switches 240A, 240B and 240C of the dispensing mechanism 41A, 41B and 41C are connected to one side of the total switch 1314, when the total bar 18 is actuated and closes the switch 1314, the relays 670A, 670B and 670C are simultaneously energized since each of the control switches is now closed.

When the relays 670 are energized, their movable contacts F are moved into engagement with their contacts G so that the coils of the relay windings will remain connected across the secondary winding 663 of the transformer when the total switch 1314 opens as long as their respective control switches 240 remain closed.

The simultaneous energization of the three relays 670 disconnects the capacitors 680 from the latch release solenoids 1362 of the three switch and key assemblies and simultaneously connects these capacitors across the secondary winding 663 so that these capacitors are immediately charged through their respective rectifying diodes 690. Simultaneously the movable contacts D of the relays 670 engage the contacts E thereof and connect the clutch lever solenoids 134 of the three dispensing mechanisms across the main conductors 1526 and 1532. The rearward or retracting movement of the armatures 140 of the clutch lever solenoids now causes the holding levers 210 of the three dispensing mechanisms to move out of locking engagement with the lock gears 110 thus freeing the drive rollers 76 of the three dispensing mechanisms for rotation about the axes of their shafts 102, the motor switches 186 to close so that the motor is energized and rotates the main shaft 96, the clutch slide cams 152 to move rearwardly and pivot the clutch levers 130 to move the clutch plates 116 into driving engagement with the gears 112 to connect the main shaft in driving relation to the three drive rollers so that the three drive rollers are rotated to dispense the tapes or strips of stamps through the dispensing apertures 31 and release the pawls 192 and dogs 196 of each dispensing mechanism for movement into engagement with the ratchet wheels 200 thereof so that the control plates 226 are reciprocated by their cams 224 and rotate the contact plates 252 of the three control switches 240A, 240B and 240C of their dispensing mechanisms through thirty degrees during each reciprocation thereof so that all three dispensing mechanisms will each dispense a stamp or a single transverse row of stamps during each reciprocation of their respective control plates 226 and simultaneously actuate their associated contacts 34 during each such reciprocation.

During the first reciprocation of the control plate 226 of the dispensing mechanism 41B and the rotation of the control disk 252 of the control switch 240B, the surface segments 253 of the contact plate 252 moves into alignment with the contact 260 thereof in the position 1 of its contact plate 259 so that such contact moves out of engagement with the arcuate contact strip 270 of the control disk thus opening the switch 240B and disconnecting the coil of the relay winding 670B from the secondary winding 663. As a result the dispensing mechanism 41B is rendered inoperative immediately after the one stamp has been dispensed from the roll 40B. The capacitor 680B is disconnected from the secondary winding 663 and connected across the clutch latch release solenoid 1362B which is momentarily energized and moves the latch plate 1388 of the switch and key assembly 1320B to the left and frees the $1 16B key for movement to its upper open position opening the switch SW1B so that when the contact disk 252 of the control switch 240B is rotated back to its original position by the force of the spring 258, the coil of the relay 670B will not again be energized which would occur if the $1 key 16B were still in its lower position holding the switch SW1B closed. Simultaneously the clutch lever solenoid 134B is de-energized and the force of the springs 136 and 138 moves the armature 140 thereof forwardly causing the clutch slide cam 142 to move forwardly to free the clutch lever 130 and the clutch plate for movement away from the gear 112 which drives the drive roller 76B thus disconnecting the still rotating main shaft 96 from driving relation with the drive roller 76B. The forward movement of the armature simultaneously moves the holding lever 210 into locking engagement with the locking gear 110 of the drive roller 76B which is thus immediately locked against further rotation. The forward movement of the clutch slide cam also moves the dog 196 out of engagement with the ratchet wheel 200 and causes the pawl dog 190 to move the pawl 192 out of engagement with the ratchet wheel so that the control disk 252 is rotated back to its at rest position by the spring 258. The motor switch 186A opens as the armature 140 of the clutch lever solenoid moves forwardly but the motor continues to operate since the other two motor switches are still closed. The solenoids 670A and 670C associated with the dispensing mechanisms 41A and 41C however remain energized as the contact disks of their control switches continue to be rotated progressively in thirty degree steps. When the contact disk of the control switch 240 has been rotated through 150 degrees and five of the stamps or five transverse rows of stamps from the roll 40A have been dispensed through the aperture 31A of the dispensing device case, the surface segment 253 of the contact disk of the control switch moves into alignment with the contact 260 at the position 5 of the contact plate 259 thus opening the switch 240A. The coil of the relay 670 is thus de-energized causing the dispensing mechanism 41A to be rendered inoperative, the 50¢ key 16A to be moved to its upper inoperative position, the drive roller 76A to be disconnected from the main shaft and locked against rotation and the contact disk 252 of the control switch 240C to return to its original position in the same manner as explained above with reference to the operation of the dispensing mechanism B. The motor 96 continues to be energized even though switch 186A is now open since the motor switch 186C is still closed.

The dispensing mechanism 41C continues to operate until six stamps or six transverse rows of stamps from the roll 40C have been dispensed from the aperture 31C of the dispensing case and the contact disk of the control switch 240C has been rotated through 180 degrees at which time its surface segment 253 moves into alignment with the contact 260 at the position 6 of its contact plate 259 thus opening the switch 240C and de-energizing the coil of the relay 670C. The de-energization of the relay 670C renders the dispensing mechanism 41C inoperative causing the drive roller 76C to be disconnected from driving relation with the main shaft 96 and locked against rotation, the $5 key 16C to be returned to its upper non-actuated position, and the control disk 252 of the control switch 240C to be returned to its original position. Simultaneously the opening of the motor switch 186C will now cause the motor 94 to be de-energized since the other two motor switches 280A and 280B are already open. The motor and all other operative elements of the dispensing apparatus are now de-energized and in their original positions. The customer may now tear off the stamps which extend outwardly of the dispensing device case 28 from the dispensing apertures 31A, 31B and 31C.

It will now be seen that a new and improved dispensing apparatus for dispensing preselected lengths of tape, such as a tape divided by transverse perforations into stamps, coupons and the like, has been illustrated and described which includes a dispensing device 12 having a plurality of individual dispensing mechanisms 41A, 41B and 41C and a common drive means, such as the main shaft 96, for driving the dispensing mechanisms and that each of the dispensing mechanisms includes a support assembly 45 for supporting, as by means of a roller 46, a supply or roll 40 of the tape, a rotatable drive roller engageable with the tape for moving the tape through a dispensing aperture 31 of a case or housing 28 of the dispensing device and an operator means for connecting the drive roller to the drive shaft.

It will also be seen that the operator means of each of the dispensing mechanisms includes a clutch lever 130 for connecting the main shaft in driving relation to the drive roller, a solenoid 134 for operating the clutch means and a control switch 240 operatively connected with the drive roller for controlling energization of the solenoid and for de-energizing the solenoid to stop operation of the dispensing mechanism when the drive roller has rotated through a preselected angle and has dispensed a preselected length of the tape.

It will further be seen that each control switch 240 includes a disk provided with an arcuate contact strip 270 and rotatable in accordance with the drive roller and a plurality of stationary contacts engageable with the contact strip, one of the contacts being a common contact and the others of the contacts 260 being index contacts and the contact strip establishing an electric connection between the common contact and the index contacts whereby the control switch 240 opens to de-energize the solenoid when the circuit between the common contact 260 and a preselected index contact is broken as the contact disk is rotated through a preselected angle predetermined by the position of such preselected index contact. It will also be seen that the contact disk is operatively connectable to the drive roller and is rotatable progressively in one direction by a control plate 226 which is reciprocated each time the drive roller is rotated through a predetermined angle, that the control plate and the contact disk of the switch have coengageable ratchet means such as the pawl 192 and ratchet wheel 200 for progressively rotating the contact disk in one direction and that the operator means includes a dog 196 engageable with the ratchet wheel to prevent rotation of the ratchet wheel and the contact disk in the opposite direction due to the force exerted thereon by the biasing spring 258.

It will also be seen that the operator means includes a clutch slide cam having means for moving the pawl and dog out of engagement with the ratchet wheel to free the ratchet wheel and the contact disk for movement to an initial or zero position when the solenoid is not energized. It will further be seen that the control plate is reciprocated by a cam 224 disposed in the cam aperture 225 of the control plate having cam surfaces for engaging spaced and opposed pairs of cam surfaces 225a and 225d and cam surfaces 225c and 225b for controlling reciprocal movement of the cam in opposite directions of its reciprocating movement.

It will also be seen that the control device 1010 for controlling operation of the dispensing apparatus includes a plurality of switch and key assemblies, such as the switch and key assemblies 1320A, 1320B and 1320C, operatively associated with the control switches 240 of the dispensing mechanisms 41A, 41B and 41C for individually controlling the operation of the three dispensing mechanisms by connecting preselected index contacts of each control switch to one side of an input circuit, the common contacts of the switches being connected to the other side of the input circuit through suitable control elements of the electric control circuit of the motor 94 and the relay 670.

It will also be seen that each of the switch and key assemblies includes a plurality of keys 16 having shafts which extend through aligned slots in a plurality of spaced parallel plates, one of the plates being movable perpendicularly relative to the key shafts and spaced shoulder means of the key shafts for limiting upward movement of the keys when the keys are in their actuated and non-actuated positions.

It will further be seen that each of the key shafts has cam means engageable with the latch plate for moving the latch plate in one direction to permit movement of the key to its actuated position and another cam means engageable with the latch plate when the key is in its actuated position and the latch plate is moved to a predetermined distance in the opposite direction by a second key as it is being moved to its actuated position to free the first actuated key to move to its upper non-actuated position whereby at any one time only one key of a switch and key assembly may be in its actuated position.

It will further be seen that the latch plate of each switch and key assembly is provided with means, such as the spring 1356, which biases it towards latching engagement with the shafts of the keys of the assembly and with a release solenoid for moving it to its opposite direction against the resistance of such biasing spring to free any key held in its actuated position for movement to its upper non-actuated position toward which the key is biased by the spring 338.

It will also be seen that the electric circuit of the dispensing means of the apparatus for individually controlling the operation of the dispensing mechanisms 41A, 41B and 41C includes main relays such as the relays 670 each operatively associated with an associated dispensing mechanism whose coil is connectable in series across a source of electric current through an actuated key 16 switch of the switch and key assembly of the dispensing mechanism, the common contact, the contact strip and the index contact of its control switch 240 preselected by the actuation of its associated key 16 and a total switch 1314 actuated by a total bar 18 of the control device, and that the main relay when energized connects the solenoid of the dispensing device across the source of electric current to cause the operation of the dispensing device.

It will also be apparent that the main relay when energized provides a short circuit across the total switch and in series with the control switch 240 for maintaining the main relay energized until the drive roller has been rotated through the preselected angle and the main switch opens.

It will further be seen that each main relay has means for connecting a capacitor across a source of current when the relay is energized and for connecting the charged capacitor across the latch release solenoid 1362 of its associated switch and key assembly to energize the release solenoid with a pulse of current whereby the release solenoid moves the latch plate to release the actuated key 16 for movement to its open position.

It will also be seen that a holding relay 543 is provided whose energization is controlled by the switches constituted by the spring lever 69 and roller 46 of the support assemblies 45A, 45B and 45C for preventing energization of any one of the main relays and thus the energization of the dispensing apparatus when the supply or roll of tape which had been supported on any roller is exhausted.

It will be apparent that while a particular electric circuit for the dispensing apparatus has been illustrated and described, that various modifications of the described electric circuit may be made without changing the mode of operation thereof. For example, the motor switches 186 may be replaced by adding another pair of contacts to each relay 670 of each dispensing mechanism which close when the coil of the relay is energized to connect the motor 96 across the main conductors and the three diodes 690 may be replaced by a single diode through which all three capacitors 680 may be charged if the single diode is of sufficient capacity to properly charge all three capacitors in the time required to dispense a single stamp from any one dispensing mechanism.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for dispensing a tape perforated to define stamps or tickets that comprises: drive roller means for engaging said tape; means producing rotation of said drive roller means; a control device including a plurality of normally open switches; a step switch having a plurality of normally closed contacts; circuit means connecting each of said plurality of normally open switches to a different one of said plurality of normally closed contacts; means to close one of said plurality of normally open switches to register the desired number of stamps to be issued; means effective responsive to closure of a circuit through said one of said plurality of normally open switches and the normally closed contact of said step switch connected thereto for actuating said means producing rotation to issue stamps; and means for indexing said step switch to open the normally closed contact connected to said one of said plurality of normally open switches when the desired number of stamps are issued.

2. An apparatus as defined in claim 1 wherein said means effective comprises: a lever, a solenoid operated cam, and means mounting said lever for pivotable movement responsive to movement of said cam; and wherein said means producing rotation comprises a drive shaft, a gear train, said gear train including a drive gear mounted on said drive shaft for normally free rotation, a collar slidably mounted on said drive shaft for rotation with said shaft, and means biasing said power and drive gear apart, said means responsive to closure of said circuit acting to force said collar against said drive gear to engage said gear train to said drive shaft, pivotable movement of said lever in one direction being effective to force said collar against said drive gear to engage said gear train to said drive shaft.

3. An apparatus as defined in claim 1 wherein said means producing rotation comprises: a motor; a drive shaft connected to said motor; a gear train, said gear train including a drive gear mounted on said drive shaft for normally free rotation; a collar slidably mounted on said drive shaft for rotation with said shaft; and means biasing said collar and said drive gear apart, said means responsive to closure of said circuit acting to force said collar against said drive gear to engage said gear train to said drive shaft.

4. An apparatus as defined in claim 1 wherein said step switch comprises: a shaft; a contact plate mounted on said shaft for rotation with said shaft, at least one face of said contact plate being of insulating material; an annular shaped contact ring formed on said one face of said plate, said contact ring and a segment of insulating material defining a circle; means supporting said contacts with said contacts bearing against said contact ring, the angular separation between adjacent contacts being equal to the angular width of said segment; ratchet means for rotatably indexing said contact plate in one direction through an angle equal to the separation between contacts to open one of said contacts; and means biasing said contact plate for rotation in the opposite direction.

5. An apparatus as defined in claim 1 further including means to disable said apparatus when stamps are not available to be issued.

6. An apparatus as defined in claim 1 further including means to return said one of said plurality of normally open switches to the open condition at the conclusion of a particular transaction.

7. An apparatus as defined in claim 10 wherein each of said issuing mechanisms further includes means for disabling said apparatus when said supply roll is exhausted.

8. An apparatus as defined in claim 7 wherein each of said issuing mechanisms further includes means for indicating the number of stamps issued.

9. An apparatus as defined in claim 8 wherein means are provided for restoring the normally open switches to the open condition; said means comprising: a capacitor associated with each issuing mechanism; means to charge said capacitor; a solenoid; and means to discharge said capacitor through said solenoid when said one of said contacts opens, said solenoid being effective to release the keys of said one group and open the closed switch.

10. An apparatus for simultaneously issuing a plurality of denominations of stamps in tape form that comprises: a control keyboard including a key set for each denomination of stamps to be issued; a plurality of normally open switches; means connecting each key in said key set to a different one of said normally open switches, each key acting to close the switch connected thereto when depressed; means for maintaining the last depressed key of said key set in the depressed condition; a control key; a stamp issuing machine including a motor driven drive shaft; an issuing mechanism for said each denomination of stamps to be issued including a step switch having a plurality of normally closed contacts; a means connecting each of said normally open switches to a different one of said plurality of normally closed contacts; a supply roll of said each denomination of stamps; stamp drive means for withdrawing stamps of said each denomination from said supply roll; a clutch for coupling said stamp drive means to said drive shaft; means effective responsive to actuation of said control key for closing a circuit through a closed one of said normally open switches and the one of said plurality of normally closed contacts connected thereto for engaging said clutch to couple said stamp drive means to said drive shaft; and means for indexing said step switch as said stamp drive means withdraws stamps from said supply roll to open said one of said plurality of normally closed contacts connected to said closed one of said normally open switches when the desired number of stamps are issued.

11. An apparatus for issuing stamps that comprises: a control keyboard for setting the value of stamps to be issued including a plurality of normally open switches; each of said normally open switches including a pair of spaced apart fixed contacts and a spanning contact adapted to span the space between said pair of fixed contacts; a plurality of depressable keys, each key being connected to the spanning contact of a separate one of said switches to close said separate one of said switches when said each key is depressed; means for biasing each of said keys in the raised position; means for maintaining the last depressed key in the depressed condition, the condition of said keys indicating the value of said stamps to be issued; a control key; a motor; a drive shaft connected to said motor; an issuing mechanism comprising a conductive roller for supporting a supply roll of said stamps; means to disable said apparatus when the supply of stamps is exhausted, said means to disable including a conductive lever biased against said conductive roller; stamp drive means including a drive roller to issue stamps when said drive roller is rotated; clutch means for operatively connecting said stamp drive means and said drive shaft to produce rotation of said drive roller; a step switch having a plurality of normally closed contacts; means for connecting one of said spaced apart fixed contacts of each of said plurality of normally open switches to a separate one of said normally closed contacts of said step switch; means effective responsive to a closure of a circuit through said step switch when said control key is operated for engaging said clutch and starting said motor; means for indexing said step switch each time a stamp issues to open one of said normally closed contacts, said step switch being indexed to open the normally closed contact connected to the fixed contact of the closed switch in said group of normally open switches when the desired number of stamps has issued; means to disengage said clutch means when the said normally closed contact connected to the fixed contact of the closed switch opens; and means to lock said drive roller against rotation when said clutch is disengaged.

12. An apparatus for simultaneously issuing stamps in several different denominations from separate supply rolls thereof which comprises: a total key; a multi-key set for each stamp denomination to be issued; a motor driven drive shaft; a separate stamp drive and clutch for stamps issuing from each supply roll; control means for each stamp drive including a multicontact step switch having a plurality of positions and movable through said position stepwise with issue of each stamp of given denomination and means biasing said step switch to a start position; means responsive to actuation of said total key for connecting each stamp drive which is to issue stamps to said drive shaft; a separate ratchet means for each step switch opposing the biasing means thereon; and means responsive to movement of said step switch to a step position number indicating issuance of a number of stamps corresponding with the position of any key in said multi-key set for disengaging said drive from said drive shaft and for release of said key and said ratchet means for reset of a said switch.

13. A dispensing apparatus for dispensing pre-selected links of elongate tape of stamps and the like including: a dispensing device comprising drive means; a plurality of dispensing mechanisms, each of said dispensing mechanisms comprising a tape support assembly, a drive roller engageable with tape supported by said support assembly for dispensing tape from said support assembly, and operator means for selectively connecting said drive roller to said drive means to cause rotation of the drive roller and dispensing of the tape engaged thereby; and individual control means operatively associated with said operator means of each of said dispensing means for individually controlling operation of each of said dispensing mechanisms to cause said dispensing mechanisms to dispense preselected lengths of tape by causing said operator means to connect said drive rollers to said drive means and thereafter to disconnect said drive rollers from said drive means when said drive rollers have been rotated through preselected angles, said operator means including an electrically operable means and said control means including a control switch operatively associated with and responsive to the rotation of said drive roller and having a plurality of index contact means corresponding to predetermined progressive angles of rotation of the drive roller for connecting said electrically operable means to an input circuit of electric current and for disconnecting the electrically operable means from the input circuit when the drive roller rotates through an angle corresponding to a preselected one of said index contacts, said control switch including a movable contact means initially engageable with all of said index contact means and movable in one direction for progressive and sequential disengagement from said index contact means in accordance with the angle of rotation of said drive roller whereby when said movable contact means moves out of engagement with a preselected one of said index contacts said electrically operable means is disconnected from said input circuit.

14. The dispensing apparatus of claim 13 wherein said operator means includes means for connecting said drive roller to said movable contact means of said control switch, said connecting means including a control plate and coengageable ratchet means connected to said control plate and said movable contact means, means operatively associated with said drive roller and said control plate for reciprocating said control plate during the rotation of said drive roller through a predetermined angle, said ratchet means moving said movable contact means a predetermined distance in said one direction during each reciprocation of said control plate.

15. The dispensing apparatus of claim 14 wherein said ratchet means includes a ratchet wheel connected to movable contact means, a pawl movable by said control plate for moving said ratchet wheel in said one direction, and a dog engageable with said ratchet wheel for holding said ratchet wheel against movement in a direction opposite said one direction, and wherein said operator means includes means biasing said movable contact in a second direction opposite said one direction; and means operatively associated with said pawl and said dog for holding said pawl and said dog out of engagement with said ratchet wheel when said operable means is not energized.

16. The dispensing apparatus of claim 15 wherein said control plate is provided with two pairs of substantially parallel spaced opposed cam surfaces, one pair of said cam surfaces extending at an angle relative to the other pair of such cam surfaces and wherein said means connecting said drive roller to said movable contact includes a rotatable cam having a plurality of pairs of cam surfaces successively and simultaneously engageable with the pairs of cam surfaces for providing and controlling reciprocating movement of the control plate, and means connecting said cam to said drive roller for causing said cam to be rotated in accordance with the rotation of said drive roller.

17. The dispensing apparatus of claim 14 wherein said control plate is provided with two pairs of substantially parallel spaced opposed cam surfaces, one pair of said cam surfaces extending at an angle relative to the other pair of such cam surfaces and wherein said means connecting said drive roller to said movable contact includes a rotatable cam having a plurality of pairs of cam surfaces successively and simultaneously engageable with the pairs of cam surfaces for providing and controlling reciprocating movement of the control plate, and means connecting said cam to said drive roller for causing said cam to be rotated in accordance with the rotation of said drive roller.

18. A dispensing apparatus for dispensing preselected lengths of elongate tapes of stamps and the like including: a dispensing device comprising drive means; a plurality of dispensing mechanisms, each of said dispensing mechanisms comprising a tape support assembly, a drive roller engageable with the tape supported by said support assembly for dispensing tape from said support assembly, and operator means for selectively connecting said drive roller to said drive means to cause rotation of the drive roller and dispensing of the tape engaged thereby; and individual control means operatively associated with said operator means of each of said dispensing means for individually controlling operation of each of said dispensing mechanisms to cause said dispensing mechanisms to dispense preselected lengths of tape by causing said operator means to connect said drive rollers to said drive means and thereafter to disconnect said drive rollers from said drive means when said drive rollers have been rotated through preselected angles, said drive means including an electric motor, said operator means including an electrically operable means for actuating said operator means, each of said control means including switch means for connecting said motor to an input circuit whenever said operator means controlled by said control means is actuated, said operator means including locking means operatively connected with said electrically operable means for locking said drive roller against rotation which is placed in its inoperative condition to permit rotation of the drive roller when said operable means is actuated and which is placed in its operative locked condition to lock the drive roller against rotation when said operable means is not actuated.

19. The dispensing apparatus of claim 18, and electric control means associated with said control means and with said support assembly of each of said dispensing mechanisms for preventing operation of said dispensing mechanism whenever a supply of tape is not positioned on any one of said support assemblies.

20. The dispensing apparatus of claim 13; and a control device including a set of switches operably associated with said control means of each of said dispensing mechanisms, the switches of a set of switches being connected in series with individual index contact means of said control means of an associated dispensing mechanism whereby each of said control means is operable only when a switch of its associated set of switches is closed.

21. The dispensing apparatus of claim 20, and a total switch closable to connect closed switches of said sets of switches in series with said index contact means of said control switch of said dispensing means for causing simultaneous operation of said dispensing mechanism.

22. The dispensing apparatus of claim 21 wherein said control means of each of said dispensing mechanisms includes a relay energized when said one of the switches of said set of switches and said total switch are closed for connecting said operable means to an input circuit, said relay short circuiting said total switch when energized.

23. A dispensing mechanism including: a main drive shaft; a drive roller; clutch means for connecting said drive roller to said main drive shaft; locking means for locking said drive roller against rotation; a cam engageable with said clutch means for causing said clutch means to connect said drive roller to said main shaft; a solenoid having an armature connected to said cam and said locking means for moving said cam into operative engagement with said clutch means and simultaneously moving said locking means to inoperative position; and a control switch operatively associated with said drive roller for controlling energization of said solenoid and causing said solenoid to be de-energized when said drive roller has rotated through a preselected angle, said control switch including a rotatable contact and a plurality of fixed contacts engageable with said rotatable contact, one of said fixed contacts being a common contact and the others of said contacts being index contacts, said control switch connecting said solenoid to an input control through said common contact, said rotatable contact and a preselected index contact, said rotatable contact being rotatable sequentially out of engagement with said index contacts as said drive roller is rotated and disconnecting said solenoid from the input circuit when it moves out of engagement with a preselected one of said index contacts.

24. The dispensing mechanism of claim 23, and means for connecting said rotatable contact in drive relationship with said drive roller when said solenoid is energized, said last mentioned means including a control plate, means operable when said drive roller is rotating for reciprocating said control plate, said rotatable contact and said control plate having coengageable ratchet and pawl means rotating said rotatable contact a predetermined distance during rotation of said drive roller through a predetermined angle.

25. The dispensing mechanism of claim 24, wherein said cam has means engageable with said ratchet and pawl means for rendering said ratchet and pawl means inoperative when said solenoid is not energized.

26. In a dispensing device, a reciprocable control plate having two pairs of spaced substantially parallel opposed cam surfaces, one pair of said cam surfaces extending at an angle relative to the other pair of said cam surfaces; and a cam member rotatable betwen said cam surfaces and having a plurality of radially outwardly extending cam projections, a forward surface of one of said projections engaging one cam surface of a pair of said cam surfaces and a rear surface of another of said cam projections engaging the other cam surface of said pair of cam surfaces during each half cycle of reciprocation of said control plate to cause and control reciprocating movement of said control plate.

27. A control device including: a key and switch assembly comprising: support means; a latch plate movably mounted on said support means and having a plurality of apertures; a plurality of keys mounted on said support means and having shafts extending perpendicularly to said latch plate and through said apertures, said key shafts each having an upper and a lower recess, a pair of laterally outwardly convergent lower and upper cam surfaces and a pair of upwardly facing vertically spaced stop shoulders defining lower ends of said recesses, means biasing said latch plate toward engagement with said shafts, and means biasing said keys upwardly, said lower cam surface of each key engaging said latch plate and moving said latch plate against the force of said biasing means when the key is moved downwardly to position said upper recesses in alignment with said latch plate to permit movement of said latch plate thereinto and the engagement of said upper cam surface with said latch plate camming said latch plate out of said upper recess when said latch plate is moved outwardly in said upper recess by downward movement of another of said keys.

28. The control device of claim 27, and electrically operable means for moving said latch plate out of said upper recess of any key held in its lower position thereby.

29. The control device of claim 28; and individual switch means operatively associated with each of said keys mounted on said support assembly and each closed when its associated key is in its lower position.

30. The control device of claim 27; and individual switch means operatively associated with each of said keys mounted on said support assembly and each closed when its associated key is in its lower position.

31. A dispensing apparatus including: a dispensing device including a main drive shaft, an electric motor for rotating said main shaft and a plurality of dispensing mechanisms, each of said dispensing mechanisms comprising a drive roller, clutch means for connecting said drive shaft to said drive roller, a solenoid for actuating said clutch means, a control switch for controlling energization of said solenoid, said control switch including a movable contact and a plurality of fixed contacts simultaneously engaged with said movable contact when said movable contact is in an initial position, said fixed contacts including a common contact and a plurality of index contacts, said movable contact moving sequentially out of engagement with each of said index contacts as it is moved in one direction, means biasing said movable contact for movement in a second direction opposite said one direction, means limiting movement of said movable contact in said second direction when said movable contact is in said initial position, means operatively associated with said movable contact for moving said movable contact in accordance with the rotational movement of said drive roller, and a main relay for connecting said solenoid to an input circuit; and a control device including a plurality of switch and key assemblies each operatively associated with one of said dispensing mechanisms of said dispensing device, each of said assemblies including a plurality of switches individually connectable in series with said fixed contacts of the control switch of its associated dispensing mechanism for connecting the main relay of the associated dispensing mechanism to an input circuit.

32. The dispensing apparatus of claim 31, wherein said control device includes a total switch connectable in series with said switches of each of said assemblies whereby said total switch must be closed to connect said main relay to an input circuit, said main relay being means for short circuiting said total switch when said main relay is energized.

33. The device of claim 32, each of said key and switch assemblies including latch means for releasably holding a closed switch thereof in its closed condition and an electrically operable means for moving said latch means to release a closed switch thereof for movement to an open position; and means operable by said main relay for momentarily energizing said electrically operable means of each assembly when said relay is disconnected from an input circuit.

34. The dispensing apparatus of claim 31, wherein each of said dispensing mechanisms includes switch means operable to connect said electric motor to an input circuit when said solenoid is connected thereto.

35. The dispensing apparatus of claim 32 wherein each of said dispensing mechanisms includes a support means for a roll of tape and switch means responsive to the absence of tape on its support means for preventing connection of the main relays of the dispensing mechanism to an input circuit.

36. A control device including: a plurality of key and switch assemblies, each of said assemblies comprising a latch plate movably mounted on said support means and having a plurality of apertures; a plurality of keys mounted on said support means and having shafts extending perpendicularly to said latch plate and through said apertures, said key shafts each having an upper and a lower recess, a pair of laterally outwardly convergent lower and upper cam surfaces and a pair of upwardly facing vertically spaced stop shoulders defining lower ends of said recesses, means biasing said latch plate toward engagement with said shafts, and means biasing said keys upwardly, said lower cam surface of each key engaging said latch plate and moving said latch plate against the force of said biasing means when the key is moved downwardly to position said upper recesses in alignment with said latch plate to permit movement of said latch plate thereinto and the engagement of said upwardly facing shoulder defining the lower end of said upper recess with said latch plate, said upper cam surface camming said latch plate out of said upper recess when said latch plate is moved outwardly in said upper recess by downward movement of another of said keys, and electrically operable means for moving said latch plate out of said upper recess of any key held in its lower position thereby; and individual switch means operatively associated with each of said keys mounted on said support assembly and each closed when its associated key is in its lower position; and a total switch connected in series with said switches of said assemblies for simultaneously closing individual control circuits of each of said assemblies when a switch means of said assemblies is closed.

References Cited by the Examiner

UNITED STATES PATENTS

| | | | |
|---|---|---|---|
| 2,755,084 | 7/1956 | Dodegge | 226—11 |
| 2,806,693 | 9/1957 | Seeley | 226—110 |
| 2,870,274 | 1/1959 | Thias. | |
| 2,878,014 | 3/1959 | Zeigle et al. | 226—11 |
| 2,934,613 | 4/1960 | Stoner et al. | |
| 2,964,313 | 12/1960 | Zeigle | 226—109 |
| 2,980,307 | 4/1961 | Crane | 226—135 |
| 3,006,538 | 10/1961 | Deutsch | 226—135 X |
| 3,089,923 | 5/1963 | Wright | 200—11 X |

ROBERT B. REEVES, *Primary Examiner.*

RAPHAEL M. LUPO, *Examiner.*

A. McKEON, *Assistant Examiner.*